United States Patent [19]

Fordham et al.

[11] Patent Number: 5,136,528
[45] Date of Patent: Aug. 4, 1992

[54] MAINTENANCE AND OPERATIONAL SIMULATORS

[75] Inventors: Donald S. Fordham; Richard A. Petersen; Charles E. Gorbet, all of El Paso, Tex.

[73] Assignee: Raytheon Company, Lexington, Mass.

[21] Appl. No.: 728,852

[22] Filed: Jul. 9, 1991

Related U.S. Application Data

[63] Continuation of Ser. No. 436,561, Nov. 14, 1989, abandoned.

[51] Int. Cl.[5] .................... G09B 23/06; G09B 9/00; G06F 15/20
[52] U.S. Cl. ................................ 364/578; 364/801; 434/224
[58] Field of Search .............. 364/578, 801, 802, 806, 364/200, 900, 506; 434/224, 366, 118, 335

[56] References Cited

U.S. PATENT DOCUMENTS

| | | | |
|---|---|---|---|
| 3,826,906 | 7/1974 | Carlson et al. | 364/802 |
| 4,042,813 | 8/1977 | Johnson | 364/578 |
| 4,144,573 | 3/1979 | Trussell et al. | 364/578 |
| 4,167,821 | 9/1979 | Gibson et al. | 364/578 |
| 4,316,720 | 2/1982 | Ackerman | 434/224 |
| 4,406,627 | 9/1983 | Winthrop et al. | 364/801 |
| 4,613,952 | 9/1986 | McClanahan | 364/578 |
| 4,776,798 | 10/1988 | Crawford | 434/224 |
| 4,792,913 | 12/1988 | Buckland et al. | 364/801 |
| 4,922,194 | 5/1990 | Gaussa et al. | 364/806 |
| 4,935,886 | 6/1990 | Choka | 364/578 |

FOREIGN PATENT DOCUMENTS

| | | | |
|---|---|---|---|
| 0212716 | 12/1984 | Japan | 364/578 |
| 0084662 | 5/1985 | Japan | 364/578 |

OTHER PUBLICATIONS

Schwager et al., Acoustic Interactive Synthesizer; Aug. 1979; IBM Technical Disclosure Bulletin pp.975-978.

Primary Examiner—Parshotam S. Lall
Assistant Examiner—Michael Zanelli
Attorney, Agent, or Firm—Denis G. Maloney; Richard M. Sharkansky

[57] ABSTRACT

Apparatus for simulating a complex system includes controller means having a sequence of instructions executed by the controller means for providing digital signals representative of a selected state and location of at least one of a plurality of indicators devices, in accordance with a software model of a system being simulated, and for receiving digital signals representative of an occurence and value of rotational motion, for receiving digital signals corresponding to an occurence of making and breaking of a signal path, and for processing said receive signals in accordance with a predetermined sequence of instructions corresponding to the model of the system simulated by the apparatus. The apparatus further includes a mock-up of the system being simulated, including a control panel corresponding substantially to the actual system having disposed thereon switches, indicator lights, and rotational motion devices, such as joy sticks, potentiometers, track balls, and the like. The apparatus further includes a simulation control means including means for interfacing the simulation control means to the system mock-up by formatting messages to the controller means to indicate to the controller status of controlled devices on the system mock-up and by receiving messages from the controller means to provide signals to control devices on the system mock-up.

16 Claims, 13 Drawing Sheets

Microfiche Appendix Included
(7 Microfiche, 115 Pages)

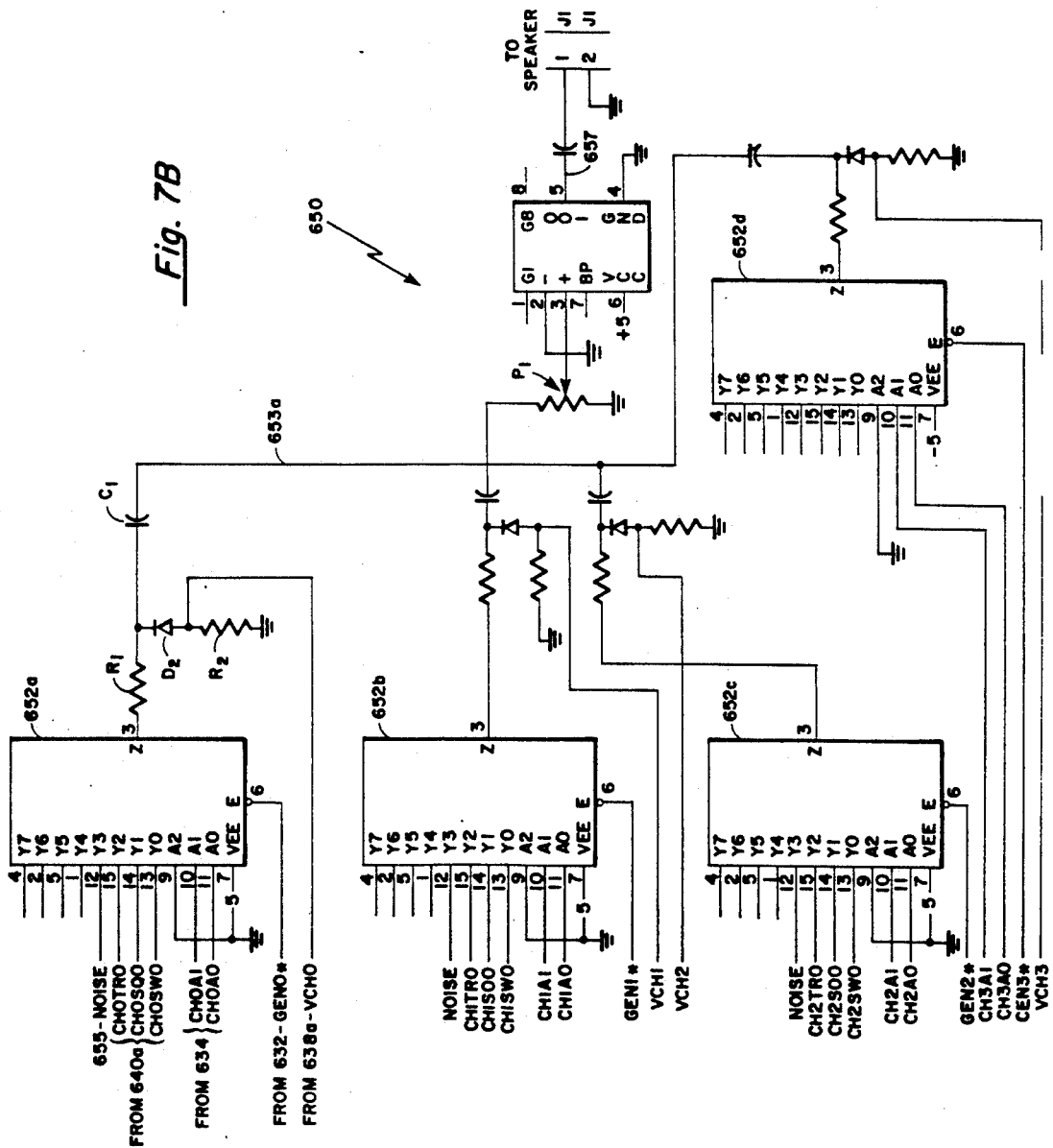

MAINTENANCE AND OPERATIONAL SIMULATORS

This application is a continuation of application Ser. No. 436,561 filed Nov. 14, 1989 now abandoned.

The software programs referred to hereinafter as Appendices A-F are contained on 7 sheets, 115 frames of microfiche.

BACKGROUND OF THE INVENTION

This invention relates generally to simulators and more particularly to simulation systems adapted to simulate a complex electrical, mechanical, or electromechanical system.

As is known in the art, many complex electrical, mechanical, and electromechanical systems are used by persons which must prior to their use receive training in either the maintenance or operation of the system. One approach commonly used to train such persons is to have such persons work with the actual system. There are many drawbacks to this approach. One obvious drawback is that often such systems are very expensive and thus, to build extra systems as training systems is economically unfeasible. Another drawback to this approach is that often such systems require the use of potentially dangerous operating characteristics, such as relatively high voltages. To permit a person undergoing training, particularly in maintenance of such systems, to train on an actually system operating with high voltages or other dangerous conditions is thus not desirable. Moreover, with complex systems which are in early stages of development or production, it is often not possible to have available an actual system to train maintenance technicians and operators.

Accordingly, it is also known in the art that with a complex system requiring an operator interface, one general solution to the problem of training the operator is to build a simulator which simulates the actual system. In the prior art, the general approach to simulation is to build combinations of hardware and software, typically digitally controlled, which simulate the actual operation or maintenance of the system. This general approach to system simulation, although quite suited to provide a simulator for a particular system, has one significant drawback. This drawback is that there is virtually no commonality between the hardware and software generated for one system and the hardware and software, which is generated for a relatively different system. Accordingly, it would be desirable to provide a simulator based upon digital software and hardware techniques, but which can be readily adapted without substantial changes in software or substantial changes in hardware to simulate any electrical, electromechanical, or mechanical system.

SUMMARY OF THE INVENTION

In accordance with the present invention, apparatus for simulating a system includes means for detecting and converting signals representative of rotational motion into a digital representation of said motion; and means fed by a digital signal representative of a selected state of one of a plurality of externally controlled devices for sending a signal to control said device and for selecting the one of the plurality of devices to receive said signal. The simulation means further includes means fed by a second plurality of signals representative of a corresponding plurality of signal paths for detecting a state of making and breaking of said signal paths, and the locations of the detected signal paths, and for providing a digital signal representative of the state of, and the locations of, each of said signal paths. With this particular arrangement, by providing means which can detect and convert rotational motion into a digital signal, provide signals corresponding to states of externally controlled devices, and process signals corresponding to signal paths being made and broken, any system which includes rotation of knobs, joy sticks, or steering wheels; the activation or de-activation of indicator lamps, relays, or circuit breakers; or the sensing of switches or other momentary contact devices being asserted or de-asserted may be simulated.

This arrangement takes an approach to the problem of system simulation that a simulator need not simulate the operation of a system, but rather should simulate the interface of the user to the system. With an electrical, electromechanical, or mechanical system, interface with the user occurs through a generic approach. The common denominators of most simulated systems are that such systems generally have indicator or lamp assemblies, relays, or circuit breakers which are activated or deactivated in accordance with certain conditions of the system, switches which make or break signal paths to provide selected control to the system, and position controls, such as joy sticks, steering wheels, track balls, or potentiometers, which set or control signals or signal levels in the system or position mechanical or electromechanical devices associated with the system. Thus, with the arrangement described above, any system which uses indicators, switches, or position controls, for example, may be at least partially simulated.

In accordance with a further aspect of the present invention, the apparatus for simulating a system further includes means, fed by digital signals representative of one state of a plurality of analog meter displays, for converting said digital representation into an analog representation of said meter display and for selecting the one of said plurality of analog meter displays to receive the analog signal. The system simulator further includes means fed by digital signals representative of volume, frequency, noise levels, and waveforms corresponding to a particular simulated audio information for synthesizing an analog voltage waveform from said digital signals. With such an arrangement, systems having analog meters used in the maintenance or operation of the system may be selectively controlled during a simulation routine. Moreover, audio information provided during operation or maintenance of a system may also be simulated.

In accordance with a further aspect of the present invention, apparatus for simulating a complex system includes controller means for providing digital signals representative of a selected state and location of at least one of a plurality of indicator devices in accordance with a software model of a system being simulated having a sequence of instructions executed by the controller means, and for receiving digital signals representative of an occurrence and value of rotational motion, for receiving digital signals corresponding to an occurrence of making and breaking of a signal path, and for processing said receive signals in accordance with a predetermined sequence of instructions corresponding to the model of the system simulated by the apparatus. The apparatus further includes a mock-up of the system being simulated, including a control panel corresponding substantially to the actual system having disposed thereon switches, indicator lights, and rotational motion devices, such as joy sticks, potentiometers, track balls, and the like. The apparatus further includes a simulation control means including means for interfacing the simulation control means to the controller means by formatting messages to the controller means to indicate to the controller status of controlled devices on the system mock-up and by receiving messages from the controller means to provide signals to control devices on the system mock-up. The simulation control means further include means fed by analog signals from the system mock-up corresponding to a value of a setting on at least one rotational motion device for detecting and converting such analog signals into a digital representation of said motion and providing such signals to the controller means, means fed by the digital signal from the controller means which represents the selected one of the plurality of indicator devices for sending a signal to control said indicator device, and for selecting the one of the plurality of indicator devices to receive such signal, means fed by a second plurality of signals from the system mock-up representative of the corresponding plurality of signal paths for detecting a state of making and breaking of said signal paths and for determining the state of and the location of the detected signal path, and for providing to the controller means the digital signal representative of the state of and the location of said detected signal path. With such an arrangement, the simulation controller includes hardware and software to simulate any combination of controlled or indicator devices, such as indicator lamps and relays; switches; and rotational devices, such as potentiometers, joy sticks, track balls, and wheels. Such an arrangement, provides generic hardware and firmware contained in the simulation controller, which may be used to simulate any electrical, electromechanical, or mechanical system using the aforementioned elements. For simulation of different systems it is only necessary to change the mock-up of the system and models of the particular system being simulated. Thus, this arrangement reduces the cost of development of new simulators for different systems, and furthermore reduces the cost of manufacture and maintenance of such systems since a major portion of the hardware and software of the simulators are common or generic to the simulation of any system. The apparatus may be used by a user to simulate a maintenance or operational task on the system. To the user, the system mock-up has the appearance of the real system. The only parts of the actual system which need to be provided in the mock-up however are the controls and indicator devices which are controlled, set, or observed by the maintenance technician or operator of the system. In general therefore, circuits used in the system, or other specialized equipment used in the system, need not be provided in a mock-up of the actual system. By including only the components of the actual system, which are used by the maintenance trainee or operation trainee, such a user will be provided with a realistic interactive hands training exercise, without the need and expense of providing the actual equipment. That is, the mock-up, in combination with the controller means and simulation controller, duplicates the look and feel of the actual equipment and emulates actual system diagnostics and maintenance and operation procedures without the need for the actual equipment to be present.

This arrangement takes an approach to the problem of system simulation that a simulator need not simulate the operation of a system, but rather should simulate the interface of the user to the system. With an electrical, electromechanical, or mechanical system, interface with the user occurs through a mock-up of the system including only those items of the actual system which indicate to the user some status of the system or which are manipulated by the user during a training exercise. The common denominator of most simulated systems is that such systems generally have indicator or lamp assemblies which are activated or deactivated in accordance with certain conditions of the system, switches which make or break signal paths to provide selected control to the system, and position controls, such as joy sticks, steering wheels, track balls, or potentiometers, which set or control signals or signal levels in the system or position mechanical or electromechanical devices associated with the system. The simulation controller includes all hardware and software to actually control indicators and observe the state of manipulated devices used by a trainee during a simulation scenario. The simulation controller operates, via commands from the controller means, which executes a software model of the system being simulated. Since the simulation controller does not model the actual system, it is generic to any system simulation. Thus, with the arrangement described above, a system which uses indicators, switches, or position controls may be at least partially simulated and cost of development of simulators for a different system is significantly reduced since generally the hardware and software in the simulation controller is generic, and thus may be used to simulate different systems.

In accordance with a further aspect of the present invention, the controller means further includes means for providing digital signals representative of a state of a selected one of a plurality of analog meter displays, and for providing digital signals representative of simulated audio information. The system mock-up includes at least one analog meter display and an audio transducer. The simulation controller further includes means, fed by the digital signals representative of one state of said analog meter display for converting said digital representation to an analog signal, which is fed to the analog meter display, and for selecting, in response to said digital signal, the analog meter display to receive the analog signal. The system simulator further includes means fed by the digital signals representative of audio information for synthesizing from said digital signals an analog signal which is fed to the transducer on the system mock-up to provide the simulated audio. With such an arrangement, systems having analog meters used in the maintenance or operation of the system may be selectively controlled during a simulation routine. Moreover, audio information provided to a user of the system during a simulation may also be simulated.

BRIEF DESCRIPTION OF THE DRAWINGS

The foregoing features of this invention, as well as the invention itself, may be more fully understood from the following detailed description of the drawings, in which:

FIG. 7B is a schematic of a circuit used to select analog audio signals from various audio channels, used in the circuits of FIG. 7.

DESCRIPTION OF THE PREFERRED EMBODIMENTS

Figure 1:
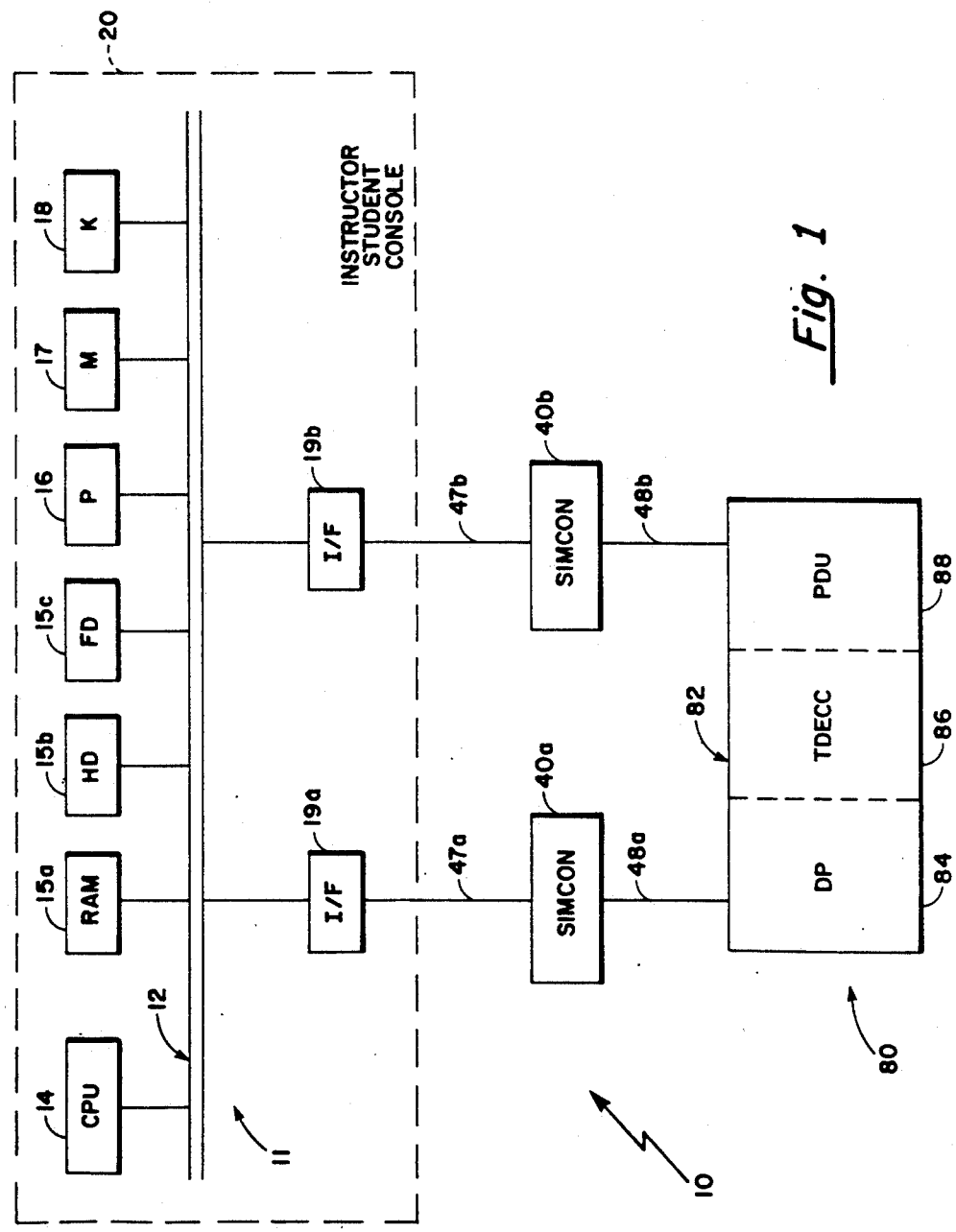
FIG. 1 is a block diagram of a system simulator including a instructor/student console, a simulation control assembly, and a mock up of a system to be simulated.

Referring now to FIG. 1, a representation of a maintenance and operational simulator 10, to simulate a complex system, such as the electronic command and control equipment for a surface-to-air missile system, is shown to include an instructor/student console 20 and a plurality of simulation control assemblies 40a-40b, (SIMCON) which are used to interface the instructor/student console 20 to a mock-up 80 of the system being simulated. Here the mock-up 80 includes a control panel (not shown) having disposed thereon switches, lamps, displays, rotational devices, such as potentiometers, track balls, wheels, as well as push buttons. The mock-up 80 further includes, as necessary, circuit breakers and dummy electronic modules, which may be reset or removed by a maintenance technician during an exercise. In the particular system simulated, a HAWK surface-to-air missile system, the missile system (not shown) includes three distinct subsystems. A continuous wave acquisition radar (CWAR) (not shown) for detection and acquisition of targets; a high power illuminator radar (HPI) (not shown) for tracking and engagement of the target; and a platoon command post 82 (PCP), which is the central control for the HAWK missile system. The HAWK missile system also includes a launcher and missile (not shown). Here the simulator 10 simulates the PCP 82. The PCP 82 includes three principle subsystems, the Data Processor (DP) 84, the Tactical Display and Engagement Console (TDEC) 86, and the Power Distribution Unit (PDU) 88. The PCP 82 includes two displays. In the particular SIMCON to be described, a SIMCON controls one display. Thus, two SIMCONs are provided to control simulation of the PCP 82. One SIMCON 40a controls DP 84 the other SIMCON 40b controls TDEC 86 with the control of the PDU being shared between the two SIMCONs 40a, 40b. Under certain circumstances, depending upon the exact configurations of the simulation 10 and requirements of the system mock-up, one SIMCON or more than two SIMCONs may be used. In any event, one or more SIMCONs may be controlled by the instructor/student console 20.

The system mock-up 82 includes an actual or substantially actual control panel (not shown) as typically used by an operator or maintainance technician. Such control panel includes inter alia switches, displays, indicator lamps, speakers, potentiometers, joy sticks, hand wheels, and the like as used on the actual system. These devices are wired as required via wire harnesses 48a, 48b to SIMCONs 40a, 40b. To the greatest extent feasible, the control panel of the system mock-up 82 duplicates the control panel of the actual operational system. However, actual circuits used in the system being simulated are not used in the system mock-up 82, thus reducing cost and complexity. When maintenance operations require the need to remove circuit boards, such boards can be simulated by blank boards mounted in the equipment but hooked up to simulate that an electrical path has been broken. This occurrence would be detected by the SIMCON, as will be described.

Either operation or maintenance of the actual system is simulated by the system simulator 10 depending upon software models of the system which are resident in the instructor/student console 20 and executed by the instructor/student console during a simulation, as will be described. Thus, suffice it here to say that the simulator 10 operates by commands sent via the instructor/student console 20 through the SIMCON modules 40a-40b. In one senario, for example, a maintenance instructor may choose a particular maintenance routine to teach or test a student in maintenance of the system 82. The instructor accesses a library of maintenance routine software models stored in the instructor/student console 20, as will be described, and selects one of the routines. The selected routine is executed by a computer 11, which is part of the instructor/student console, causing messages to be sent to the system mock-up 82 and received from the system mock-up 82 through SIMCONs 40a-40b. Such messages simulate faults in the system mock-up 82. In accordance with a predetermined fault isolation technique as specified, for example, in a maintenance manual specific to the system mock-up 82, the student proceeds through maintenance steps to isolate and correct the simulated fault. Thus, the student is positioned at the system mock-up 82 and adjusts switches and rotational devices; removes mockup circuit boards, takes measurements, and performs other maintenance checks on the system mock-up 82. Messages from the instructor/student console 20 via lines 47a, 47b and sent to and decoded by the SIMCON 40a, 40b and in response the SIMCONs 40a, 40b sets indicator lamps, meters, and the like via wire harnesses 48a, 48b on the system mock-up 82. The SIMCONs 40a, 40b also detect and monitor actions taken by the student at the system mock-up 80. The SIMCONs 40a, 40b prepares and formats messages to send to the instructor/student console 20 indicating that such actions have occurred. The instructor/student console 20 software makes a record of such actions and may determine the appropriateness of the action taken by the student. Thus, the instructor can monitor the student's performance. Alternatively, the student may select his own routine from a predetermined list of such routines as determined by the instructor and practice the selected maintenance routine.

Typically, therefore, the instructor/student console 20 is manned by the instructor to initiate a simulation routine. The student is generally stationed at the mock-up hardware 82 and performs maintenance tasks on the hardware by adjusting potentiometers, switches, taking measurements, and the like, such as would be specified in a maintenance manual. The maintenance tasks are performed for a particular routine in a sequence in accordance with the maintenance manual for the actual system. The computer models stored in the instructor/student console 20 are used to simulate a fault on the mock-up of the system 82 via some fault indication, such as a light being on when it should be off. The simulated fault, however, may not be readily apparent. It is up to the student to step through predetermined maintenance routines as specified in the maintenance manual to determine that a fault occurred and also to isolate the fault. The maintenance trainee is stepped through the modelled procedure by prompts which are sent to displays (not shown) on the system mock-up 82. Such models are selected by the instructor, via the instructor/student console 20. The student's performance is also monitored by the instructor/student console 20 and results of the performance are stored therein, and later may be retrieved by the instructor to ascertain the student's progress.

The student/instructor console 20, thus stores and executes maintenance model routines. Each maintenance model includes sequences of instructions which selectively determine faults to be simulated on the mock-up of the system 80. Actual simulation of such faults, however, is performed by one of, here, a plurality of SIMCONs 40a–40b. Each one of SIMCONs 40a–40b, as will be further described in conjunction with FIGS. 2 through 8, are identical and provide all the firmware and hardware necessary to simulate any combination of the aforementioned switches, indicator lamps, speakers, potentiometers, and so forth, which in general would be encountered when simulating any complex system.

Thus, still referring to FIG. 1, the instructor/student console 20 portion of the simulator 10 is shown to further include a computer system 11 having a central processor 14, which feeds a bus network 12, here such bus network comprised of control lines, address lines, and data lines (not otherwise shown) to interface the CPU 14 to memory elements 15a–15c, here said memory elements comprised of a random access memory 15a, a hard disk drive 15b, and a floppy disk drive 15c. The instructor/student console 20 further includes a printer 16, a graphics display or monitor 17, and a keyboard 18.

The instructor/student console 20 further includes, here a plurality of serial interface modules 19a–19b, which interface the instructor/student console 20 to a corresponding one of the SIMCONs 40a–40b, as shown. Here, the instructor/student console 20 is any personal computer system, preferrable to an IBM-AT (IBM, Inc.) or AT compatible personnel computer system, operating in an MS DOS (Microsoft, Inc.) environment. Resident on the hard disk 15b of the instructor/student console 20, therefore, are software routines, which interface the instructor/student console to the SIMCONs 40a–40b, and models of maintenance or operation routines specific to the system being simulated, as will be further described in conjunction with FIG. 9.

Figure 2:
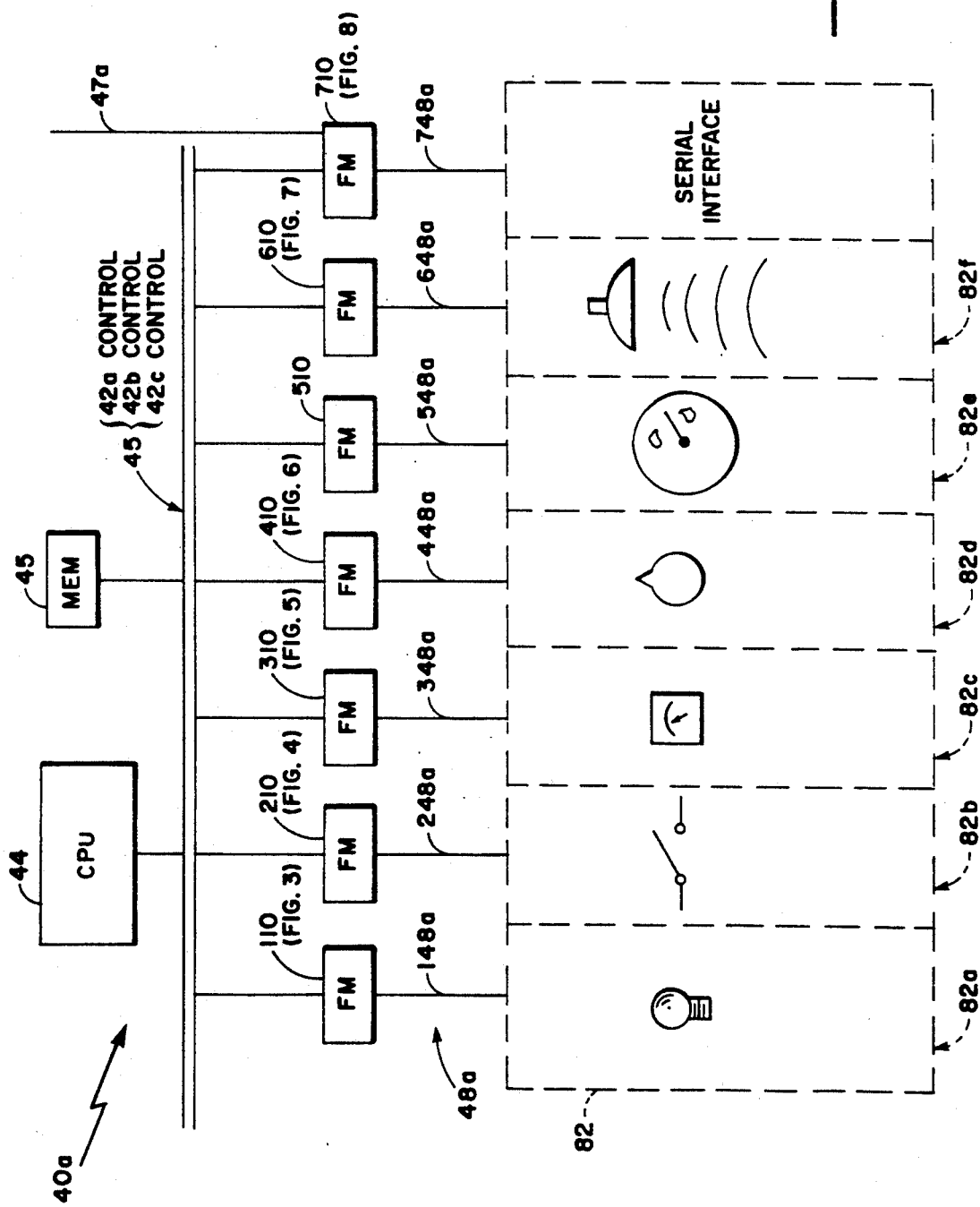
FIG. 2 is a block diagram of the simulation control assembly, as shown in FIG. 1.

Referring now to FIG. 2, a SIMCON 40a representative of each one of said SIMCONs 40a–40b is shown to include a central processing unit 44 and associated memory 45, here said memory including EPROM, which has resident therein firmware to interface functional modules 110–710 of the SIMCON 40a to the CPU 44 and RAM, which is loaded with program modules as required to provide the memory from which the CPU actually executes the program to interface the SIMCON to the instructor/student console 20 and mock-up 82. CPU module 44 is here a single board computer designed to operate on the IBM-AT bus. It thus uses any of the family of 80×86 (INTEL, Inc.) microprocessor microcircuits. The maximum real time processing requirements of the system mock-up 82 is the primary factor used in determining which of the processors to select. The CPU module in combination with the firmware stored in EPROM is used to interface the SIMCON 40a to the instructor/student console 20 (FIG. 1), as well as, the simulated system 82 (FIG. 1). Here, the SIMCON firmware is generally described in conjunction with FIG. 10. Suffice it here to say however, that the firmware resident in memory 45 is used by CPU 44 to interface the various functional modules 110–710 between the mock-up system 82 and the instructor/student console 10 of FIG. 1.

Figure 3:
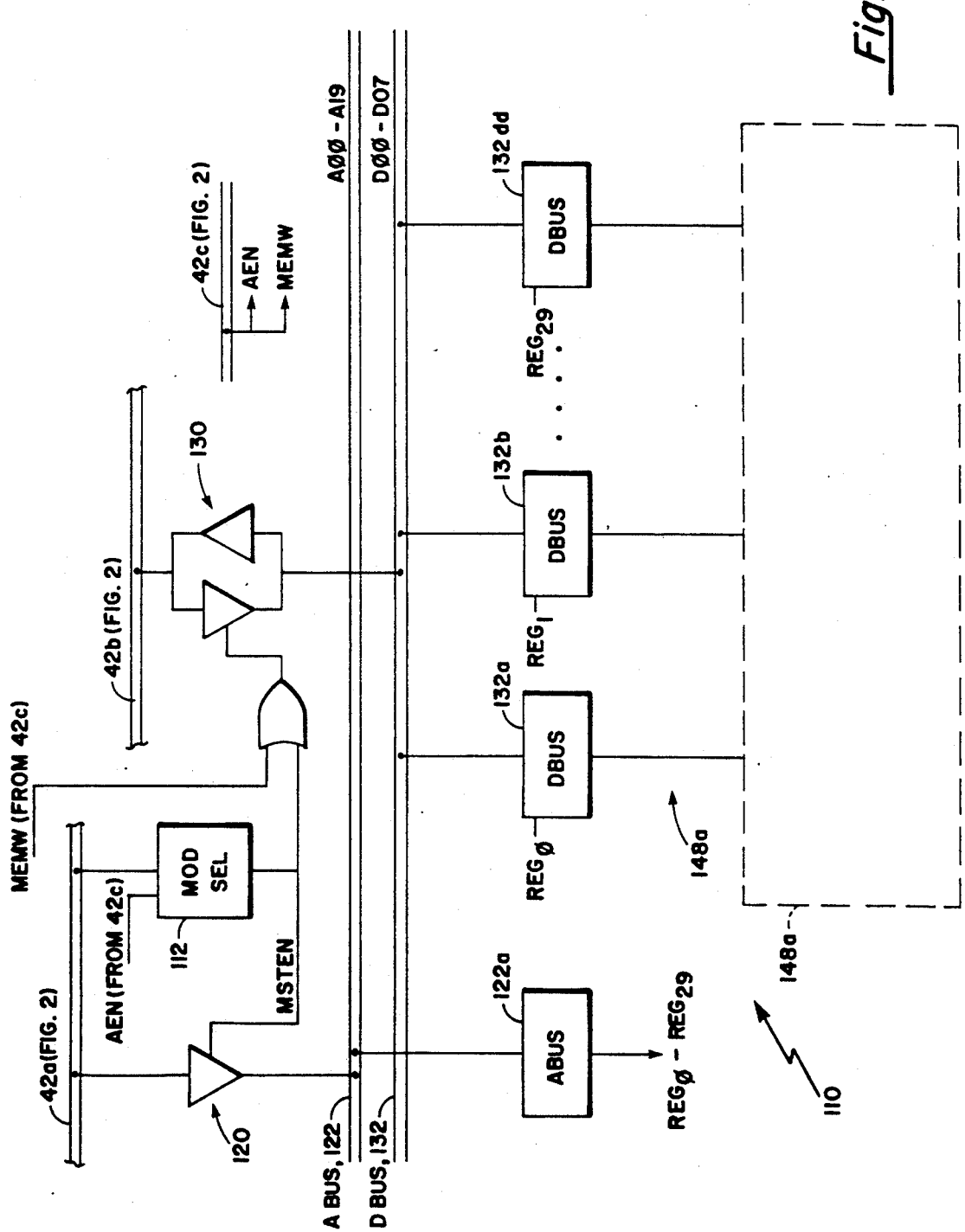
FIG. 3 is a block diagram of an arrangement of circuits used in the simulation control assembly of FIG. 2 to control devices, such as indicator lamps, relays, and circuit breakers on the system mock up of FIG. 1.
Figure 4:
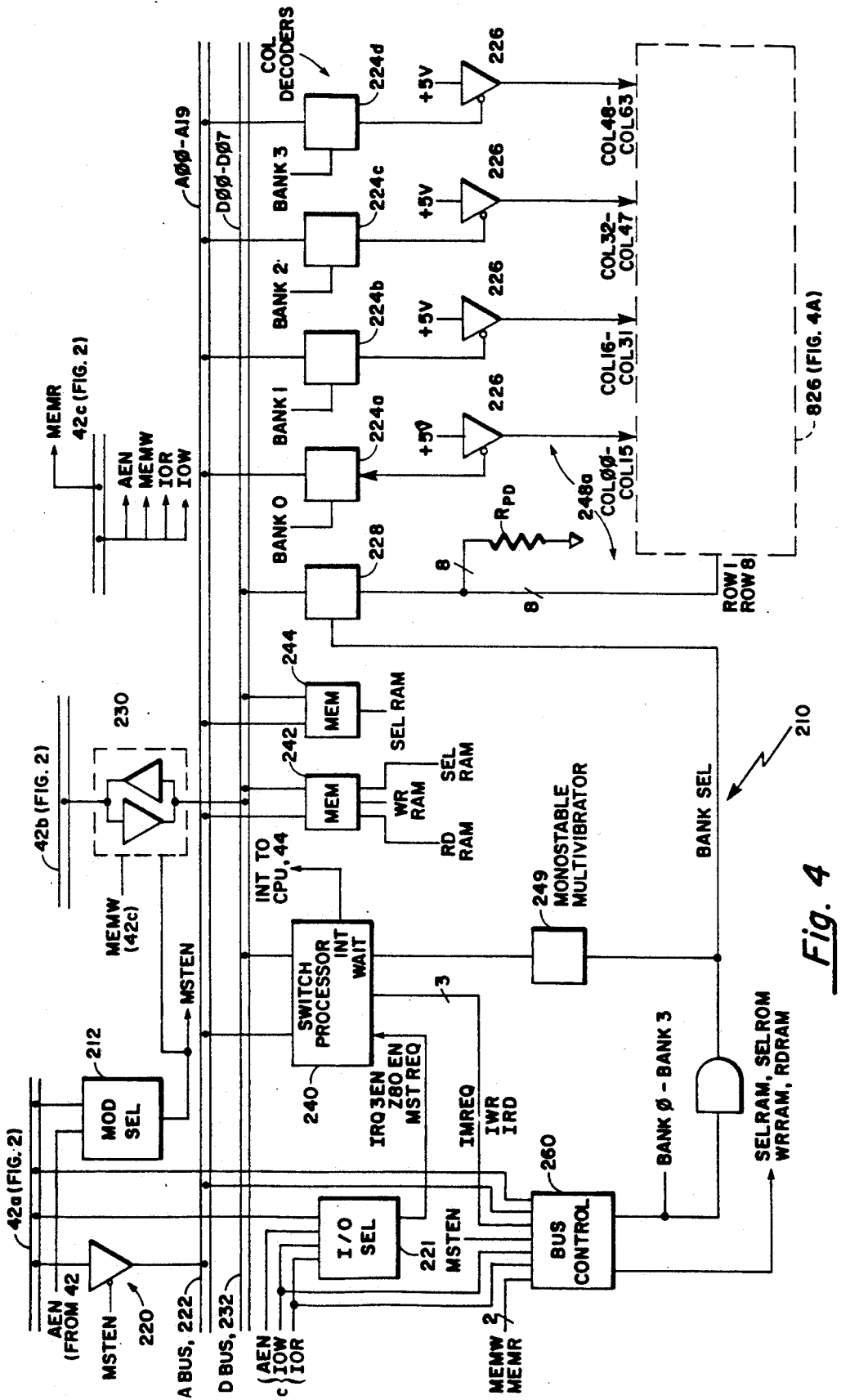
FIG. 4 is a block diagram of an arrangement of circuits used in the simulation control assembly of FIG. 2 to monitor and detect the state of and location of switches in the system mock-up of FIG. 1.
Figure 5:
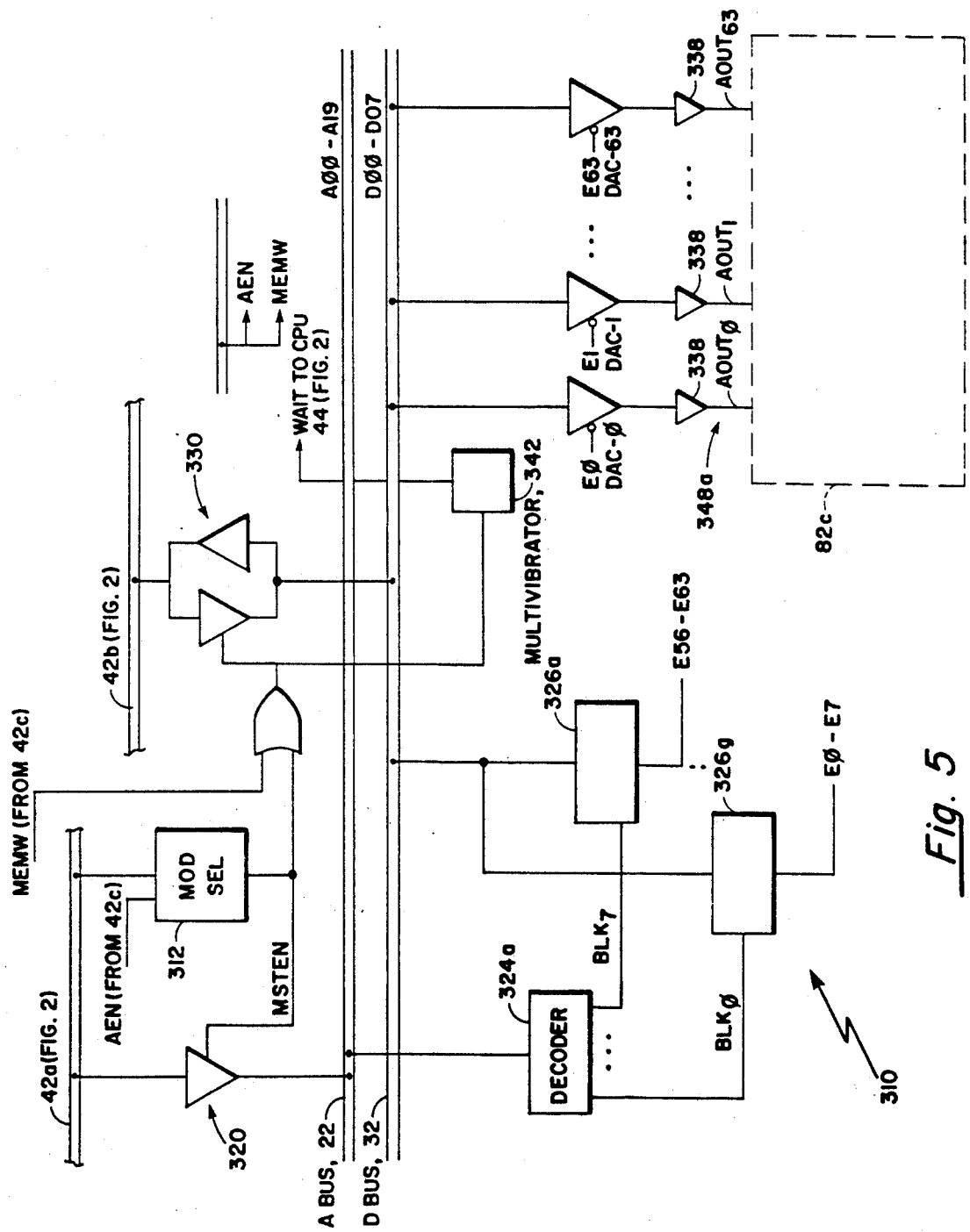
FIG. 5 is a block diagram of an arrangement of circuits used in the simulation control assembly of FIG. 2 to convert digital information to an analog voltage to control an analog device, such as an analog meter in the system mock up of FIG. 1.

Still referring to FIG. 2, the functional modules included in a typical SIMCON are here shown to include a lamp module 110 used to control, via a harness 148a, devices on the mock-up 82, such as lamps 82a, or relays, circuit breakers, etc., as will be further described in conjunction with FIG. 3, a switch module 210 used to detect, via a harness 248a, switches 82b being opened and closed, as will be further described in conjunction with FIG. 4, and a digital/analog conversion module (D/A module) 310 used to control, via a harness 348a, analog meters 82c, as will be further described in conjunction with FIG. 5. Moreover, the SIMCON module 40 further includes an analog to digital module (A/D module) 410 used to detect, via a harness 448a, rotational motion, such as from potentiometers 82d, as will be described in conjunction with FIG. 6, a graphics processor module 510 used to control, via a harness 548a, displays 82e. Module 510 is here a commercially available module from National Designs, Inc., which uses a T.I. 34010 graphics processor on a Genesis 1024 card. The SIMCON 40a further includes an audio module 610 used to send, via a harness 648a, audio to a speaker 82f, as will be described in conjunction with FIG. 7, and a serial interface module 710 having lines 47a and 748a, as will be described in conjunction with FIG. 8.

The graphics control of a system mock-up is included in the SIMCON. This module, like the other modules in the SIMCON is substantially generic. That is, the hardware and much of the firmware used to display particular images is generic. What is here unique to the particular system being simulated 82 is that portion of the firmware which selects particular sequences of images to be displayed. This firmware is unique to the system being simulated. Here commercial RS-232 serial interfaces (FIG. 1) are used to interface the instructor/student console 20 to the serial interface module 710 in the SIMCON 40a via line 47a. This communication port operating, here at 38.4K baud is too slow to adequately control, update, and otherwise generate graphics for the displays required in the mock up of the system 82. Although the instructor/student console 20 could be directly connected, via a high speed interface, to the system mock-up 82 to provide the graphics information, this arrangement is not preferred because it would force a particular configuration for the instructor/student console 20. Thus, some of the firmware on the graphics card must be changed to simulate different systems. Here, the SIMCON is installed in a standard 19" rack mounted case (not shown) including a 12 slot IBM-AT compatible passive back plane (not shown) with associated power supply (not shown). Into this rack (not shown) are inserted combination of the abovementioned modules to perform the required hardware aspects of the generic simulation functions described above. All of the modules, accordingly, conform to the IBM-AT form fit factors for both mechanical and electrical specifications. Any mix of modules, accordingly, is possible in accordance with the required simulation tasks.

Figure 8:
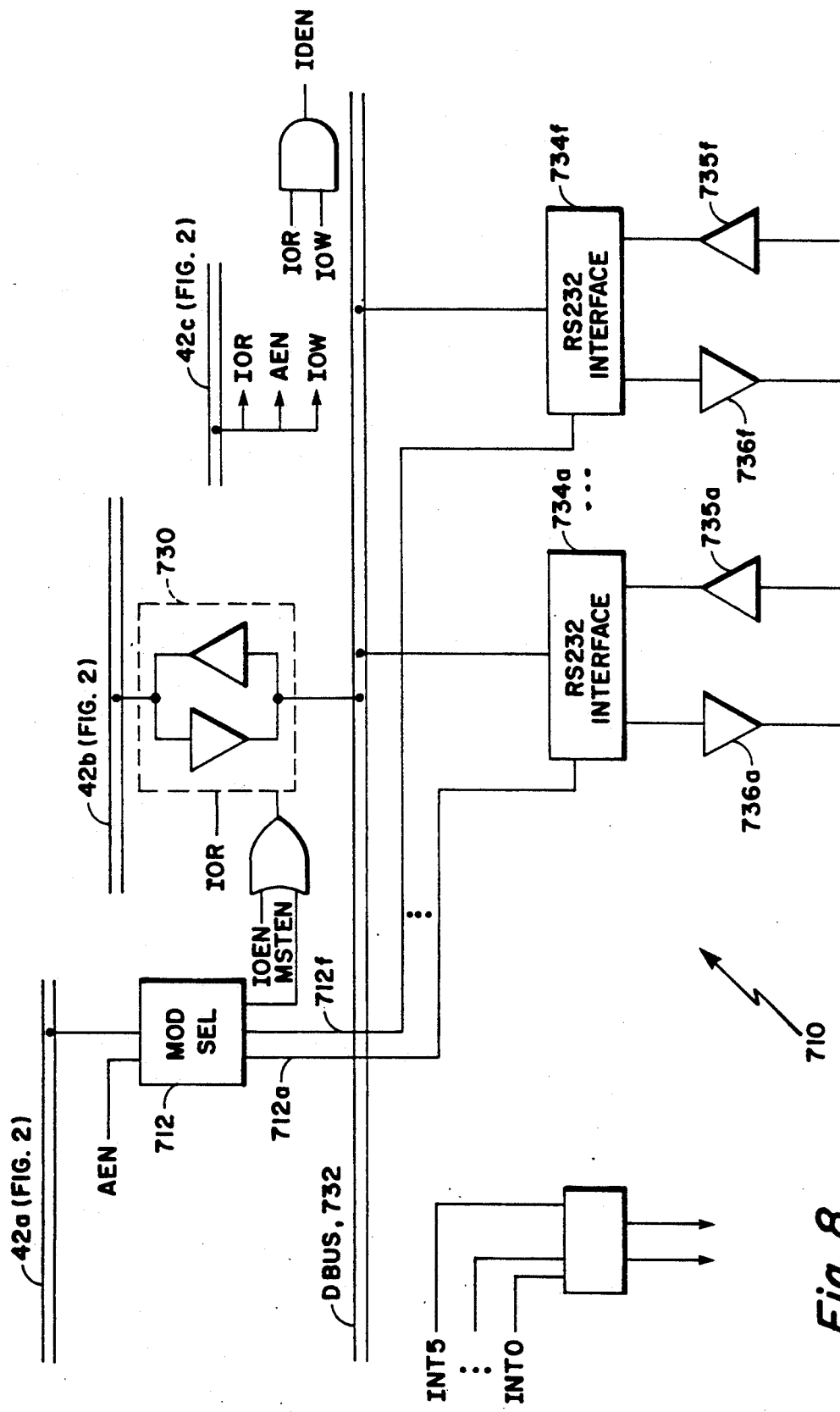
FIG. 8 is a block diagram of a serial interface to provide serial interface channels.

Here serial interface module 710, as will be further described in conjunction with FIG. 8, provides a serial interface along line 47a between the SIMCON 40a and a corresponding serial interface module 19a of the instructor/student console 20 (FIG. 1). Thus, suffice it here to say that CPU module 44 provides a internal bus 42 comprised of address lines 42a, data lines 42b, and control lines 42c. Each one of the functional modules 110-710 are interfaced to the CPU 44, via the bus 42.

Figure 4A:
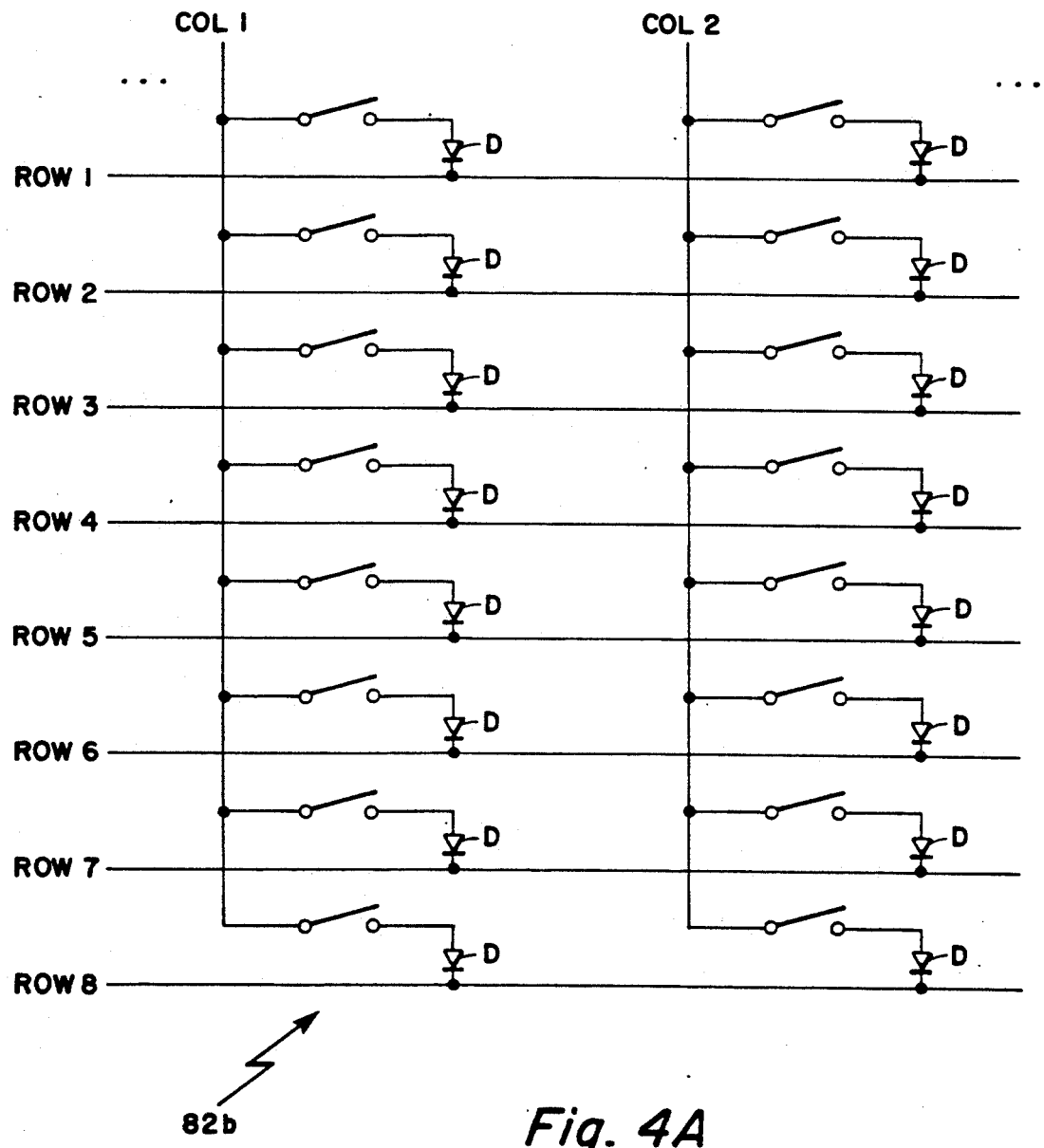
FIG. 4A is a schematic representation of a switch matrix used in the system mock-up and used with the circuits of FIG. 4.

A typical example of the simulator 10 in operation to simulate the mock-up of system 82 would include the switch module 210 (FIG. 4) monitoring switches on a switch matrix 82b (FIG. 4A) and the lamp module 210 controlling indicator lamps 82a on the system mock-up 82. The switch module 310 of SIMCON 40a will interface the instructor/student console 20 to switches on the mock-up 82 through a wiring harness, here 248a. The switches on the mock-up 82 are wired together to provide a matrix of columns and rows, as shown in FIG. 4A, and as will be further described. In such a switch matrix 82b may be included push-buttons switches, toggle switches, as well as a circuit board, which when installed properly, provides a switch indication of being a closed path and when removed provide a switch indication of an open path. Activation of a device, such as a switch or insertion of or removal of a module on the mock-up 82 results in a row/column detection by hardware and firmware resident in module 210. The SIMCON, having no specific intelligence regarding the device being simulated or the meaning of the activation of the device, simply formats a digital word and sends it to the instructor/student console 20 via the serial interfaces indicating the row and column of the device which was detected. The message would also include information as to the state of the device, (i.e. whether a closed or open path was detected). The software resident in the instructor/student console 20 forwards these digital messages to an appropriate software model resident in the instructor/student console 20. During execution of this model software, a determination is made, as to what action if any should be taken as a result of the device being simulated. Thus, resident in the maintenance model software is the capability of determining the actual location of the device with respect to the mock-up system 82, as well as, the meaning of the operation which occurred by changing the status of the device. For example, activation of a switch may require a lamp to be turned "on" in the system mock-up 82 corresponding to the activation of the switch. Thus, the instructor/student console software will format a serial message to the SIMCON module 110 which will be fed to the SIMCON module 40a via the CPU 44 to format instructions to lamp module 110 to activate one of the indicator lamps.

Referring now to FIG. 3, a lamp module 110 which is here used to selectively activate and de-activate indicator lamps 82a, as well as, relays, circuit breakers (not shown) of the system mock-up 82 (FIG. 2) is shown to include module select logic 112, here a programmable logic array, which is fed an address via address lines on address bus 42a from SIMCON processor 44 of FIG. 2, as well as, an address enable "AEN" or valid signal from bus 42c (part of the CPU control bus), which indicates when the information on address bus 42a is valid.

A typical address format for lamp module 110 is:

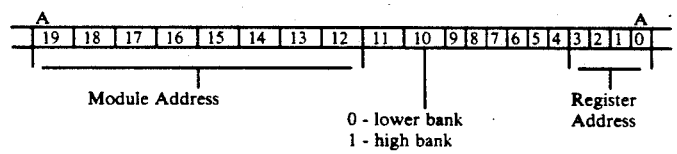

In response, the programmable logic array produces a master enable MSTEN in accordance with well known decoding techniques, if the valid addresses and data on address bus 42a, and data bus 42b are intended for module 110. If valid, and intended for module 110, MSTEN activates line receivers 120 to permit address information on the address bus 42a to be coupled through receiver 120 onto internal address bus ABUS Master enable, MSTEN, in conjunction with MEMW from the control bus 42c of CPU 42, are used to activate line transceivers 130, which connect the data bus 42b to the internal bus, D bus, of module 110. Thus, if the module 110 was selected by an address (BITS A12 to A19) corresponding to module 110, a negative assertion on the output of the programmable logic array 112, for line MSTEN is provided. The address present on the address bus 42a is fed to internal address bus, ABUS 122. Here bits A0φ to AO3 and A10 are fed to decoders 122a, here of the 4-line to 16-line digital decoder type, such as the 74LS154 type. Coincident with address information on bus 42a are data information on data bus 42a. This data are fed from bus 42b and are coupled to internal data bus DBUS 132. The data on DBUS 132 are fed to a plurality of registers 132a to 132dd. In accordance with the address decoded from the 4 least significant bits A00 to A03 and bit A10, for example, of the address bus, one of said thirty registers will be activated via signal on lines REG$_0$–REG$_{29}$ from decoders 122a to load in parallel the data on the DBUS 132 into a selected one of the registers 134a-134dd.

This data will appear at outputs of register 134a-134dd and provide signals on individual ones of wires contained in wiring harness 148a, which is connected to lamps 82a, relays, and the like on system 82 to selectively activate or de-activate the bank of indicator lamps 82a, for example, of subsystem 82. Thus, the instructor/student console 20 will format a message to SIMCON 40a, which corresponds to an address to select one of the registers 134a-134dd on module 110 to receive the data. The instructor/student console 20 will also format the data to selectively activate or de-activate one or more of the lamps from the data in the selected register. The address is thus decoded from internal address bus ABUS 122 and produces register enables, $REG_0-REG_{29}$. Data on DBUS 132 is fed to each of a plurality of registers 134a-134dd, as shown, and in accordance with the assertion of one of the register enables, $REG_0-REG_{29}$ such data are loaded in parallel into the selected one of registers 134a-134dd. In this manner, the outputs of such registers are connected to the lamps 82a of the subsystem 82 and in accordance with the state of signals fed to the registers 134a-134dd selected ones of the lamps 82a are activacted or de-activated on the mock-up of the subsystem 82. Thus, with this particular module, the instructor/student console, in accordance with a predetermined senario, may be used to feed commands to the simulation control module to configure the lamp module 110 to select and control devices, such as the indicator lamps 82a on the system mock-up 82.

Referring now to FIG. 4, the switch module 210 is shown to include module select logic 212, here also a programmable logic array, which is fed an address via address bus 42a, an address enable signal, AEN, to determine when data and addresses on lines 42b, 42a are intended for module 210, and a signal SLAVEN to indicate that CPU 44 does not have control of internal module buses. The module select logic produces a master enable, MSTEN in accordance with a predetermined decoded address corresponding to module 210 as for module 110.

A typical address format for switch module 210 is:

interrupt be generated, and fed back to the SIMCON central processor 44. Accordingly, here the switch module includes a switch processor 240, which generates an interrupt to the SIMCON CPU module 44 to indicate to the SIMCON CPU 44 that a switch has been asserted. The SIMCON CPU module in turn generates commands to the switch processor to determine the address, that is the row and column, of the switch which was detected, as well as the state of change of the switch. The SIMCON CPU 44 obtains access and control of internal buses ABUS, DBUS to access memory 242, via a second programmable logic array 221, which is fed address lines from bus 42a and control signals IOW, IOR, AEN from control bus 42c and is used for bus control and permits the module CPU 240 to relinquish control of the internal buses to the SIMCON CPU 44 by feeding signals IRQ3EN, Z80EN, MSTREQ, and INTREG to CPU 240 to cause CPU 240 to relinquish control of internal buses to CPU 44. Such signals also control generation of SLAVEN to permit processor 240 to run.

The module further includes a third programmable logic array 260, here used to provide bus control for memory and coder for the switch module 210. This PLA is used to decode address bus 42a to enable memory when CPU processor 44 (FIG. 2) is accessing the internal data and address buses of the module 210, or when the switch processor is using its internal buses. When accessed by the SIMCON CPU 44 address information is on bus 42a and I/O request signals IOW, IOR are from control bus 42c. When accessed by switch processor 240, address information is on bus 222 and control signals IMREQ, IWR, IRD are provided from the switch processor 240. The I/O programmable logic array provides output signals SELRAM, SELROM, RDRAM, WRRAM, which are provided to the memories 242-244 and the bank enable signals $BANK_0-BANK_3$, which are fed to the decoders 224a-224d.

Firmware which controls the switch processor 240 is stored in EPROM memory 244. Memory 242 is here, a random access memory, which is used by the switch processor 240 in processing the information from the SIMCON processor, as well as from the switch matrix 82b (FIG. 4A). The switch processor in conjuntion with

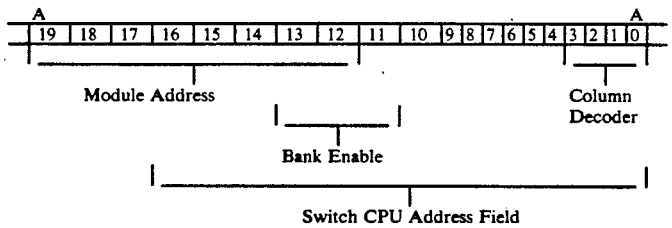

Module 210 further includes address buffer 220, which when enabled by master enable, MSTEN, permits address information from bus 42a to be coupled to the internal address bus ABUS 222 of module 210, as shown. Master enable MSTEN, when asserted, also permits data to be coupled between data bus 42b and an internal data bus DBUS 232 through tranceivers 230. A read or write signal from CPU 44 (FIG. 2) determines direction of data flow on DBUS. The function of switch module 210 is to detect the occurrence of an electrical path being made or broken by the assertion or de-assertion of a switch on the simulated system 82a via harness 248a. Such an occurrence therefore, requires that an firmware stored in memory 244 polls each one of the switches in the switch matrix 82b by send strobes sequentially along each of the column lines and detecting the presence or absence of the strobes along the row lines. Thus, the switch processor formulates address messages, which are fed, via ABUS 222, to column decoders 224a-224d which select one of here of 64 columns by asserting a logic level "0" on the selected column line COL 1 to COL 64. Signals $BANK_0-BANK_3$ are fed to the decoders to enable the proper decoder and to serve as an indication that address information on ABUS 222 is intended as coded column addresses. Here column decoders are 74LS174 types 4 to 16 line decoders. As shown in FIG. 4A, each column has eight switches having one terminal thereof connected together via a column line. The other terminal of each switch in each one of the 64 columns (2 columns shown) is connected to a diode D for isolation. These terminals are connected together via a common row line, here one of ROW 1 to ROW 8 lines.

Thus, the switch processor 240 continually polls each of the switches in the switch matrix 82b. The switch processor takes control of internal data and address buses 222 to 232 and provides address information on address ABUS 222 to selectively in sequence address each one of a plurality of column lines COL 0-COL 63. This is accomplished by providing enable outputs from the decoders 224a-224d, which are fed to the enable inputs of line drivers 226. The inputs of the line drivers 226 are connected to a logic high level, here plus five volts. Thus at the output of the line drivers is provided a logic level of plus five volts, when such driver is enabled by one of the column enables.

Thus, in sequence, each one of the column lines COL 0-COL 63 are provided with a logic plus five volt strobe. In accordance with the state of each one of the switches in the column, for example, COL 1 as shown in FIG. 4A, the corresponding diodes D, which connect a second terminal of each switch in a particular row to a common row line will be forward biased or back biased depending upon the state of the switch. A logic 1 level appearing on a selected one of the row lines indicates that the switch at that column and row (e.g. col. 1, row 5) has been closed. An open switch is detected by a logic 0 appearing on such lines. The row lines are connected to a buffer 228 and pull down resistors $R_{PD}$, which are activated by a signal bank select BANKSEL. BANKSEL is the logic "AND" of each one of the bank enables, BANK 0 to BANK 3.

Thus, the state of each switch in each COL 1 is fed onto the bus 232 and is fed by the processor into memory 242 and the processor makes the determination as to whether the state of any one of the switches in the bus has changed, and if such state has changed, will generate an interrupt to the SIMCON processor to cause the processor 240 to halt while the SIMCON processor 44 reads from memory 242 the status of all of the switches. Due to the speed at which the CPU processor runs and problems of contact bounce, the switch matrix 82b is generally scanned at a 40 millisecond rate and a 1 to 3 millisecond hold or wait state is provided while each switch is scanned by having BANKSEL feed a monostable multivibrator 249, whose output is fed to the wait state terminal on the Z80 microprocessor 440. The multivibrator is used to provide a wait state pulse of typically 1 to 3 milliseconds in duration.

Referring now to FIG. 5, a digital to analog conversion module 310, which may be used, for example, to set analog meters 82c on subsystem mock-up 82 via harness 348a is shown to include module select logic 312, here also a programmable logic array, used to decode address information on address bus 42a to select module 310, as was generally described above in conjunction with the aforementioned modules 110 and 210. The modules select logic 312 generates a master enable MSTEN, which is used to signify to module 310 that address information and data information on address bus 42a and data bus 42b, respectively are valid and intended for module 310.

A typical address format for D/A module 310 is:

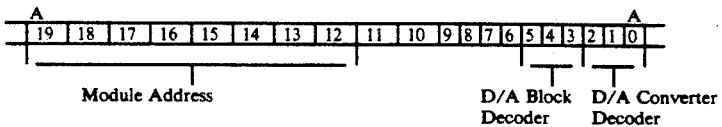

Module Address | D/A Block Decoder | D/A Converter Decoder

Thus, master enable MSTEN is fed to line receivers 320 to couple address information on bus 42a to internal address ABUS 322, as well as, to transceivers 330 to couple data information on data bus 42b to internal data DBUS 332 as was generally described for module 110. The address information coupled to address ABUS 322 (Bits AO3-AO7) is fed to a 3-8 decoder 324a of a 74LS138 type, which provides a plurality of, here 8, output enables. Here such enables $BLK_0$–$BLK_7$ are D/A block enables, which are used to enable one of eight additional 3-8 decoders 326a-326g, which also decode address lines A00-A02, as shown. Thus, decoders 324a-324g produce enables $E_0$–$E_{63}$ and are fed to respective D/A converters $DAC_0$–$DAC_{63}$. Thus, each of said 8 block decoders 324a-324g decodes 8 different lines and accordingly 64 unique enable outputs are provided from the decoder circuits. Such enables $E_0$–$E_{63}$ are fed to respective one of digital to analog converters, here DAC-6088 type converters. While one of enables $E_0$–$E_{63}$ is selectively valid, data is fed on internal data bus 332 and such data is fed to each one of the digital to analog converters DAC-1–DAC-63. A hardware generated wait state using a 74123 type multivibrator circuit 342 is provided back to the SIMCON processor to permit the D/A converters to update properly.

The information on the data bus 332 corresponds to a predetermined voltage level, which may be used to provide a predetermined setting on a meter, for example, in the meter bank 82c of the subsystem 82. In accordance with the address fed on address bus 322, one of the enables $E_0$–$E_{63}$ are asserted, permitting the data in data bus DBUS to be fed and latched into the selected DAC, $DAC_1$–$DAC_{63}$. The selected one of DAC-1–$DAC_{63}$ thus provides and holds an analog output voltage level at the output thereof which corresponds to the converted digital representation. This voltage is fed to a corresponding one of a plurality of an operational amplifiers 338, here each being an LM-324 to directly drive the afore-mentioned meters 82c in the subsystem 82.

Thus, the instructor/student console provides selected formatted messages to the SIMCON 40a. The SIMCON processor 42, directs such messages to the D/A module 310. Such messages correspond to address messages, which select the one of the analog meters 82c of the simulated system 82, as well as a voltage level to feed to the meter to cause a selected level to be displayed by the selected meter 82c. Such meter 82c is thus selected by activating one of the enable outputs $E_0$–$E_{63}$ to activate a corresponding one of digital to analog converters DAC-1-DAC-63 while feeding the predetermined digital data to the digital to analog converter to provide in response a predetermined analog output on one of the output lines AOUT$_0$–AOUT$_{63}$ of harness 348a.

Figure 6:
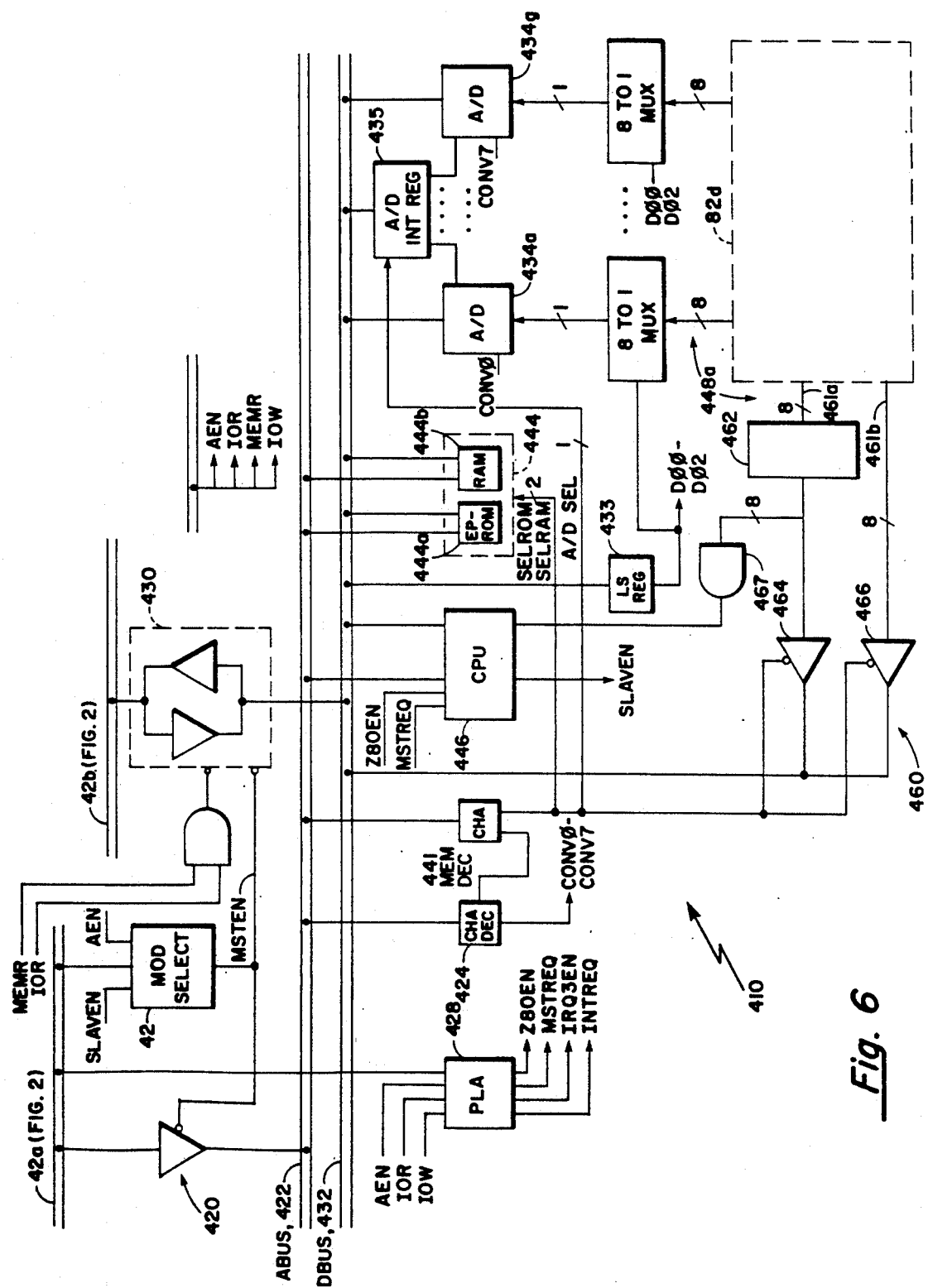
FIG. 6 is a block diagram of an arrangement of circuits used in the simulation control assembly of FIG. 2 to detect and convert signals representative of rotational motion into a digital representation of such motion.

Referring now to FIG. 6, an analog to digital module 410, is shown. The module is here used to detect and convert analog information corresponding to rotational motion into digital information. For example, the analog module 410 may be used to convert an analog voltage representative of a value of resistance on a potentiometer 82d into a digital voltage to be fed into the instructor/student console 20 to determine information concerning a student's proper setting or adjustment of the potentiometer during a maintenance routine, for example. Here analog to digital converter channels are used to convert such analog information into digital information, which originates from devices having stops, such as a potentiometer. The analog to digital module also includes an optical coupler interface circuit 460, which is used to feed information corresponding to rotational motion of devices which do not have stops. Thus, unlike a potentiometer, which generally has stops, and thus which can be easily ascertained by a voltage analog to digital conversion, for continuous rotational devices, such as a hand wheel or track ball, optical coupler channels 460 are used to couple the information into the analog to digital module.

Thus, the analog to digital module 410 is shown to include module select logic 412, here also a programmable logic array, which is fed address lines A12–A19 via address bus 42a address enable AEN a generally described in conjunction with FIG. 3 and signal SLAVEN from A/D module processor 440. Here said module select logic 412 provides MSTEN a master enable corresponding to the SIMCON writing to the A/D module 10 with the module under control of an A/D module processor 440. Here the processor is a Z80 microprocessor from Zilog, Inc. As with the switch module 210 (FIG. 4), the A/D module processor 440 will relinquish control of the buses in the module to the SIMCON CPU 42 when requested. Here PLA 412 is active only when the A/D module processor 440 has not relinquished control of internal data buses and address buses to CPU 42. Module address logic 412 produces master enable MSTEN, which is here used to activate the line buffers 420 to couple address bus 42a (FIG. 2) to internal address ABUS 422, as well as, to enable transceivers 430 to couple data on data bus 42b to the internal data DBUS 432.

A typical address format for A/D module 410 is:

ory, which are used to control the analog to digital module 410, and thus provide a level of control below the CPU module 44 of the SIMCON. It is envisioned that the A/D conversions may generate a relatively large number of interrupts, as well as noise, as a potentiometer or track ball is adjusted. Most of these adjustments will be relatively small compared to the time scale of the microprocessor 44 (FIG. 2). Thus, here the CPU 440 is provided to permit threshold levels to be independently set for each channel. The CPU 440 thus determines whether the converted information from a channel represent a significant change in adjustment of potentiometers, track balls, and the like, above the present threshold, and thus significant enough to generate an interrupt to the CPU module 44 of the SIMCON 40a. The sensitivity or magnitude of change which the analog to digital module will use to initiate an interrupt sequence to the instructor/student console 20 is selectively initialized for each channel by an initialization sequence from the instructor/student console 20.

The analog/digital module 410 is shown to further include, a memory decoder 441, which decodes address bits A11–A13 and provides signals used to control memory operations, loading of interrupt registers, as will be described, control DBUS access for optical coupler information and enables to initiated an A/D conversion in selected channel as determined by the channel decoder 424. Channel decoder 424 here decodes bits A03–A06 (with A06 used as an enable) and a signal from memory space decoder 441. Firmware is stored in the EPROM 444a, whereas initialization values for the various analog to digital channels are stored in the random access memory 444b. RAM 444b is also used during execution of the program and is used to store converted information from the A/D channels and optical coupler channels.

The CPU 440 constantly polls or monitors each of the analog to digital channels and the optical channels on the module 410. Polling is accomplished by sending out addresses on internal address bus 422, which are decoded by address decoder 424 and by memory decoder 441. Memory decoder 441 is used to ascertain whether the address on the address bus 422 corresponding to analog/digital converter channels memory locations or optical coupler channels. Signals SELRAM, SELROM are fed to memory 444. Signal A/DSEL is used to load A/D interrupt register 432. Signal INTREG and DIRREG are used to control access to DBUS 432 for the

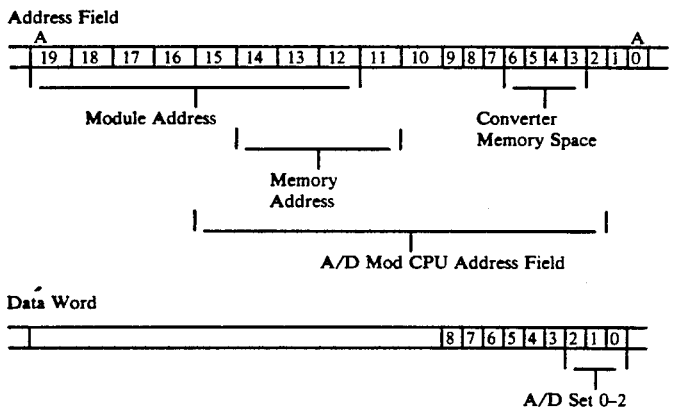

Here the analog to digital module has a separate microprocessor and control logic, as well as resident memory, optical coupler channel 460, as will be described.

If addresses on ABUS 422 correspond to analog to digital converter channels, an appropriate one of here 8 analog to digital converters 434a–434g will be enabled by control signals CONV0–CONV7 provided from the 3–8 decoder 424, as shown. Associated with each one of the analog to digital decoders is an analog multiplexer, here a 1 to 8 analog multiplexer 434a–434g of a type 4051, which in response to three bits of data fed from DBUS 432, and stored in a line select register 433, selects one of 8 channels for each one of said 1 of 8 analog multiplexers 434a–434g. As an example, 000 stored in register 433 will select the first or the zero channel in each one of the multiplexers 434a–434g, causing each one of the multiplexers 434a–434g to couple its zero input line to its output. At the output of each one of said multiplexers 434a–434g, therefore will be an analog voltage corresponding to the analog voltage fed to zero channel of each one of the multiplexers 434a–434g. However, in accordance with the address fed to the analog to digital converter decoder 424, only one of said analog to digital converters will be activated. Thus, the selected one of said analog digital converters will receive the analog information and convert such information into a digital word to be fed on data bus DBUS 432 into the processor 440. After conversions are complete an interrupt is generated by the A/D converter. The interrupt is fed to interrupt buffer 432. CONVREG and IRD from the processor are used to enable the interrupt lines on the DBUS 432. By coupling the buffers 432 onto the data bus DBUS 432, the Z80 can determine which A/D converter caused the interrupt.

Using firmware routine stored in memory 444a, the value of the data word, converter, and channel will be ascertained to determine whether or not a difference in the value of the data and a previous value (i.e. two potentiometers settings), for example, is beyond the threshold for the channel to cause the CPU 440 to generate an interrupt to the SIMCON CPU 42. Thus, if the interrupt is generated by the CPU 440 of analog to digital module 410, the digital representation of the value of the analog signal converted, as well as, the address which corresponds to the particular channel converted, will be read by the SIMCON CPU 42 from the memory 444a. A second programmable logic array 428 is fed address information from bus 42a, as well as I/O signals IOW and IOR from control bus 42c and an address enable. This PLA 428 generates output signals used to set and clear interrupts on the processor 440, inhibit the processor 440, thus obtain access to the internal buses of the module 440. This scenario is used to set threshold levels, as well as read converted values for each of the channels. Signals Z80EN and MSTREQ are used to disable the processor 440 and generates SLAVEN to inhibit the module 410 from interacting with the CPU 440. IRQ3EN and INTREG are used to indicate to the SIMCON CPU processor 44 that an interrupt from the 440 processor has been asserted.

Ultimately CPU 44 will generate an interrupt to the instructor/student console 20, and send these data to the instructor/student console 20. These data are properly formatted and sent to the instructor/student console computer 11. The executing system module in instructor/student console computer 11 will determine what action, if any, to take as a result of the interrupt, based upon the value and address of each A/D converter channel.

The optical coupler channels work in a similar manner. Here channels 0–7 are fed from optical couplers of the type H25E-SS-800-ABZ-7406 RS M16 by BEI, Inc. Westminster, Colo. Such couplers are coupled to shafts of a rotating device, such as a trackball and produce a pair of pulse trains with said trains having a 90° phase difference therebetween. By comparing the relative phase of the trains, an indication of the direction of rotation of the devices is provided. Pulse train A signals 461a from each of here eight optical couplers are loaded into a register 462 and used to set an interrupt by "ANDING" such signals together via "AND" gate 467. The A pulse train 461a from each channel are loaded into interrupt register 462. The B pulse train 461b is compared with the pulses in train A to ascertain the direction of rotation of devices in each one of the channels. Each channel, A, B thus has eight different pulse trains from eight monitored shafts. Each line of pulse train channel A is compared to the corresponding line in pulse train channel B. If the pulses on line A "lead" those on the corresponding line in channel B, then the shaft which the particular optical coupler is monitoring is moving counterclockwise. The opposite phase state i.e. A channel "lags" B channel will indicate that the monitored shaft is rotating clockwise. Buffers 464, 466 are selectively enabled, via signals from decoder 441, to couple CHB and CHA onto DBUS 432. Such signals are fed to processor 440 and analyzed to ascertain direction of rotation.

Figure 7:
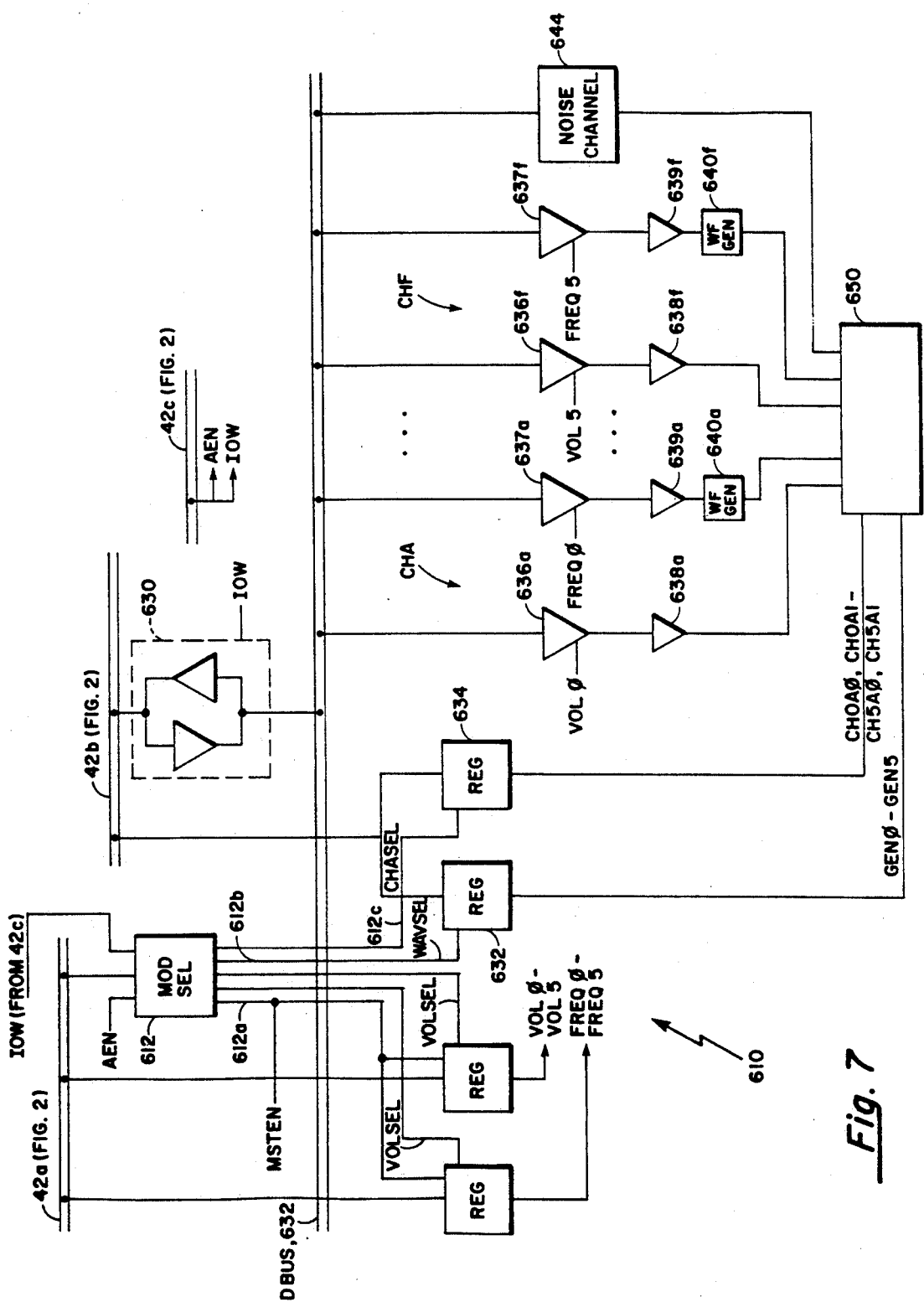
FIG. 7 is a block diagram of an arrangement of circuits used in the simulation control assembly of FIG. 2 to synthesize an analog signal corresponding to simulated audio on the system mock-up in FIG. 1.

Referring now to FIG. 7, a audio module 610, which is used to convert digital signals representative of audio information including amplitude, frequency, waveforms and noise into an analog voltage, to be fed to an audio transducer such as a speaker 82e (FIG. 2) on the simulated subsystem 82 is shown. The module 610 is shown to include module control logic 612, which here generates signals corresponding to a master enable MSTEN, along line 612a to indicate that addresses and data are valid and intended for module 610, as generally described in conjunction with FIG. 3 for module 110, as well as, signals which correspond to an indication that data and addresses on respective buses are intended as wave selection data, volume selection data, frequency selection data, and channel selection data, as will be described.

A typical address format for audio module 610 is:

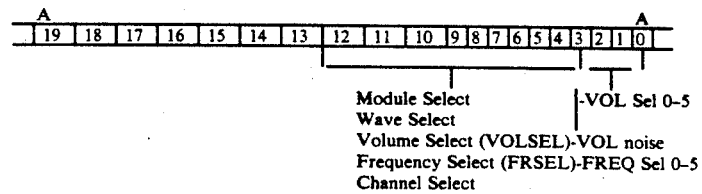

The module is shown to further include, here a pair of 8-bit registers 632, 634, which are coupled directly to data bus 42b, as well as transceivers 630, as shown. The pair of registers are activated by control signals, WAVSEL and CHASEL, which are provided from the module control logic 612, along lines 612b, 612c, respectively, and are used to indicate waveform select and channel select information to the audio module 610.

The module 610 further includes, here 6 channels CHA-CHF of independently controlled audio. Each channel selectively generates a selected volume signal, as well as here sine wave, square wave, and triangle waveform of a selected frequency. For example, the first one of said channels includes a pair of digital to analog converters 636a-636f, 637a-637f, each of which feed a operational amplifier 638a-638f, 639a-639f of LM-324 type. A first data word corresponding to a volume level is fed to one of the selected digital analog converters 636a-636f, via data bus DBUS 632, and a second data word corresponding to frequency information is fed to the corresponding one of said digital analog converter 637a-637f. Each of such digital signals are converted to an analog signal by the D/A converters 636a-636f, 637a-637f. The converted analog signal from one of converters 636a-636f corresponding to a volume level and is fed directly to tone select switches 650. The signal from one of converters 637a-637f corresponds to a frequency, and is fed to a waveform generator here an ICL-8038.

In response to the signal fed to one of waveform generators 640a-640f, a triangular wave, square wave, and sine wave signals having a frequency corresponding to the frequency information provided from one of the amplifiers 639a-639f are provided. These signals, CH0TRO, CH0SQ0, and CH0SW0, provided from channel A, for example, are fed along with such information CH1TRO-CH5TR0; CH1SQ0 CH5SQ0, and CH1SW0-CH5SW0 from channels B-F to tone select control switches 650. In accordance with channel select signals CH0A0,A1-CH5A0,A1 fed from channel registers 634 and enable signals GEN0-GEN5 fed from WAVESEL register 632, selected ones of said channels, A-F or white noise provided from a noise channel 644, as will be described, is fed through the switches to an amplifier, and ultimately to a speaker, here 82e (FIG. 2) on panel 82.

Figure 7A:
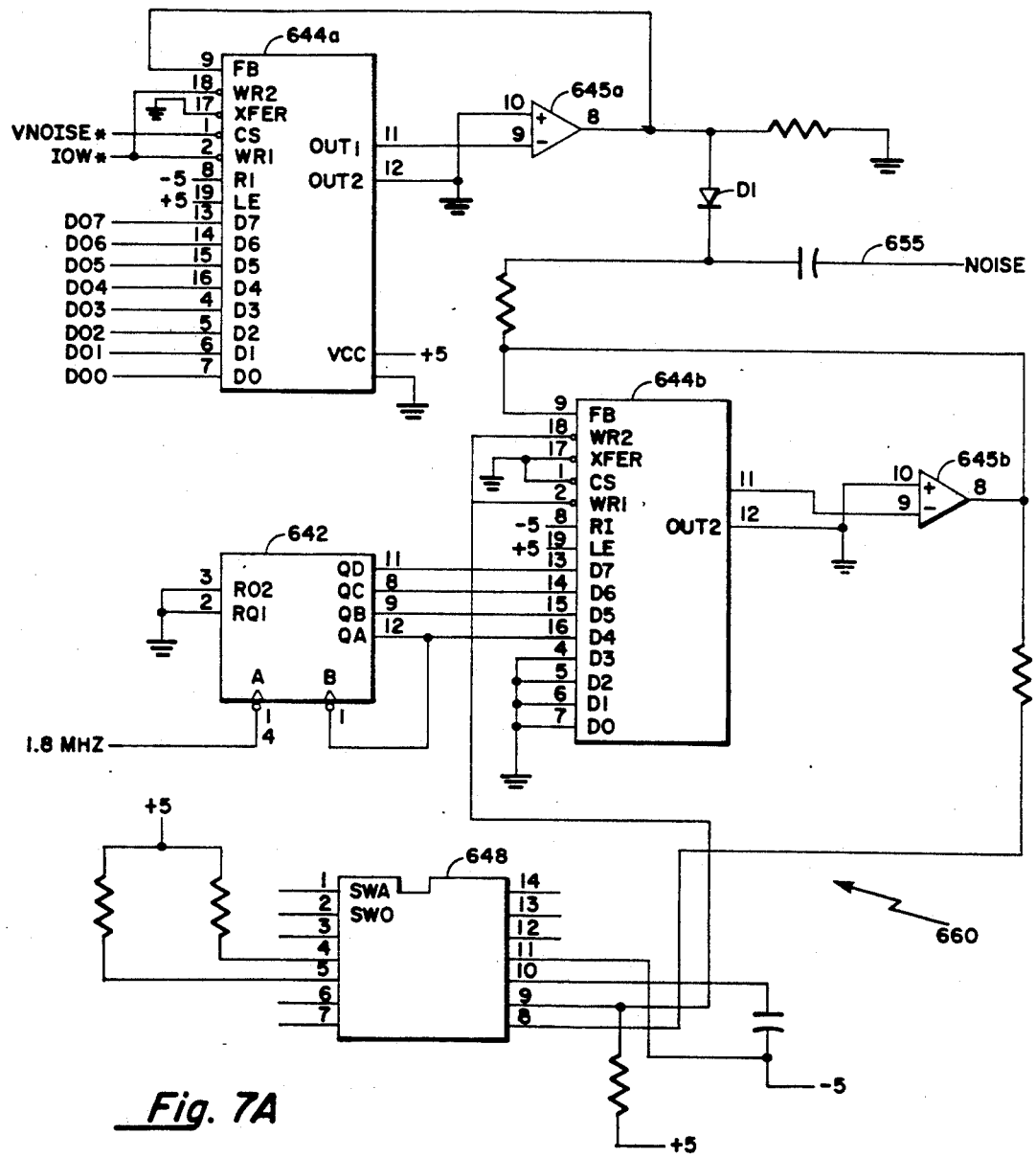
FIG. 7A is a schematic of a circuit used to generate a white noise signal used in the circuit of FIG. 7.

Referring now to FIG. 7A, the noise channel 644 here also includes a pair of D/A converters 644a, 644b. A digital word is fed to converter 644a to provide a volume level thereto, as was generally described above, as also shown. In accordance with the voltage level fed on the anode portion of diode D1 a random noise output of variable amplitude (controlled by VNOISE) will be provided on line 655 from the output of the amplifier 645b.

The audio channels A-F are specifically implemented in a similar manner as the noise channel, as shown in FIG. 7A, except that the converted volume level signal is not fed directly to the output of the second D/A converter channel, but is used at the tone switches 650, as will be described, and the second D/A converter channel is fed frequency information from the data bus 632, rather than random, loaded signals from counter 642. Moreover, the output of the D/A converter is used to provide only the frequency information into the waveform generator and the square wave, triangular wave, and sine wave outputs of the waveform generator are provided as the outputs of the audio channel.

Referring now to FIG. 7B, the tone select switches 650 are shown to include, here a plurality of analog multiplexers 652a-652d. Here only channels A-D are used. Using channel 0 as exemplary of the channels, signals CH0TRO, CH0SQ0, CH0SW0, and NOISE are fed to multiplexer 652a. In accordance with the state of signals CHA1, CHA0 fed to the address inputs of said multiplexer 652a, one of said inputs will be coupled to the output of the multiplexer 652a. The volume signal here VCH0 is fed at the anode of diode D2, as shown, and in combination provides a selective voltage divider between resistors R1 and R2 to couple a portion of the amplitude of the signal from multiplexer 652a through capacitor C₁ to line 653a. Similarly, each one of the multiplexers 652b-652c provide on lines 653b-653d a composite signal at potentiometer P₁, which has its wiper arm coupled to a amplifier of the LM386 type to provide a mixed and amplified output signal at line 657, which may be fed to speaker 82e (FIG. 2) on system mock-up 82.

Referring now to FIG. 8, a serial interface module 710 is shown to include module select logic 712, here also a programmable logic array, which decodes addresses (here in I/O address space) on address bus 42a to provide a master enable MSTEN for module 710, as generally described for module 110.

A typical address format for serial I/F module 710 is:

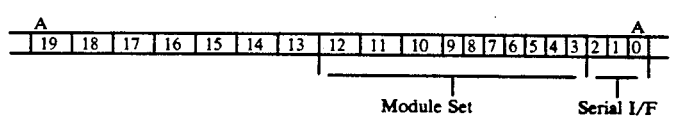

Module Set      Serial I/F

Serial Channels 1 through 6     Control Codes for the audio channels A-F. The output of said converter is fed to an operational amplifier 645a, here a LM324 type, to provide an analog output signal. The output signal is coupled via a diode, D1, to an output line 655. Here, the second D/A converter is fed via a 4 bit digital counter 642 operating a clock frequency of here 1.8 megahertz. The output from the counter 642 is fed to the four MSB's inputs of the D/A converter 644b. A free running waveform generator 648 has the square wave output thereof, used to provide enables to randomly load via outputs of counter 642 the data from counter 642 into the D/A converter 644b. The output from DAC 644b is also fed to an amplifier 645b of the LM324 type and is coupled via a resistor to the line 655, Master enable MSTEN, in conjunction with IOR, IOEN, is used to activate transceivers 730. The module control logic 712 also generates enables on lines 712a-712f to selectively feed parallel information from DBUS 732 into RS-232 interfaces 734a-734f, here 16550 types in accordance with addresses fed to module control logic 712 on address bus 42a (SIMCON address bus). Thus, enables 712a-712f are provided at the output of module 712 to selectively enable one of the RS-232 interfaces 734a-734f to send or receive data from DBUS 732. Here address bits A0-A2 are used to identify data, handshaking and other information such as baud rate for the serial interface circuits 734a-734g. Each one of said interfaces is used to convert parallel information fed on data lines D0–D8 into serial, formatted information. For example, one of said channels is used to communicate with the instructor/student console 20 (FIG. 1) and thus provide information between the instructor/student console and the SIMCON 40a. Each serial interface channel includes line receivers 735a and line drivers 736a. Line drivers are here typically MC-1489 type circuits, whereas line receivers are here MC-1488 type circuits.

To simulate maintenance and repair of portions of system 82 having high voltages, for example, or to simulate measurements of resistance, a simulated multimeter, as described in our copending application filed on the same day as this application, Ser. No. 436,527, filed Nov. 14, 1989 incorporated herein by reference and assigned to the assignee of the present invention may be used. The simulated multimeter (not shown) is in communication with the instructor/student console 20 via one of the serial interfaces on module 710. Suffice it here to say that the simulated multimeter includes a function switch and range switch, and a pair of test leads, which are A.C. shorted together via a capacitor. The test leads are placed on test points, which are wired into the switch matrix 82b (FIG. 4A). When the leads touch two of such points they simulate the closing of a switch. This occurrence is handled by the instructor/student console as a switch being opened or closed. The instructor/student console determines from the "switch" messages from the switch module 210 whether the correct test points were measured. If the console, via the serial interface channel B, sends a message that is used to display a value of the simulated voltage or resistance on meter displays. The instructor/student console is also fed the switch and range information over the serial I/F channel B and uses such information to determine whether proper settings were placed on the meter.

Figure 9:
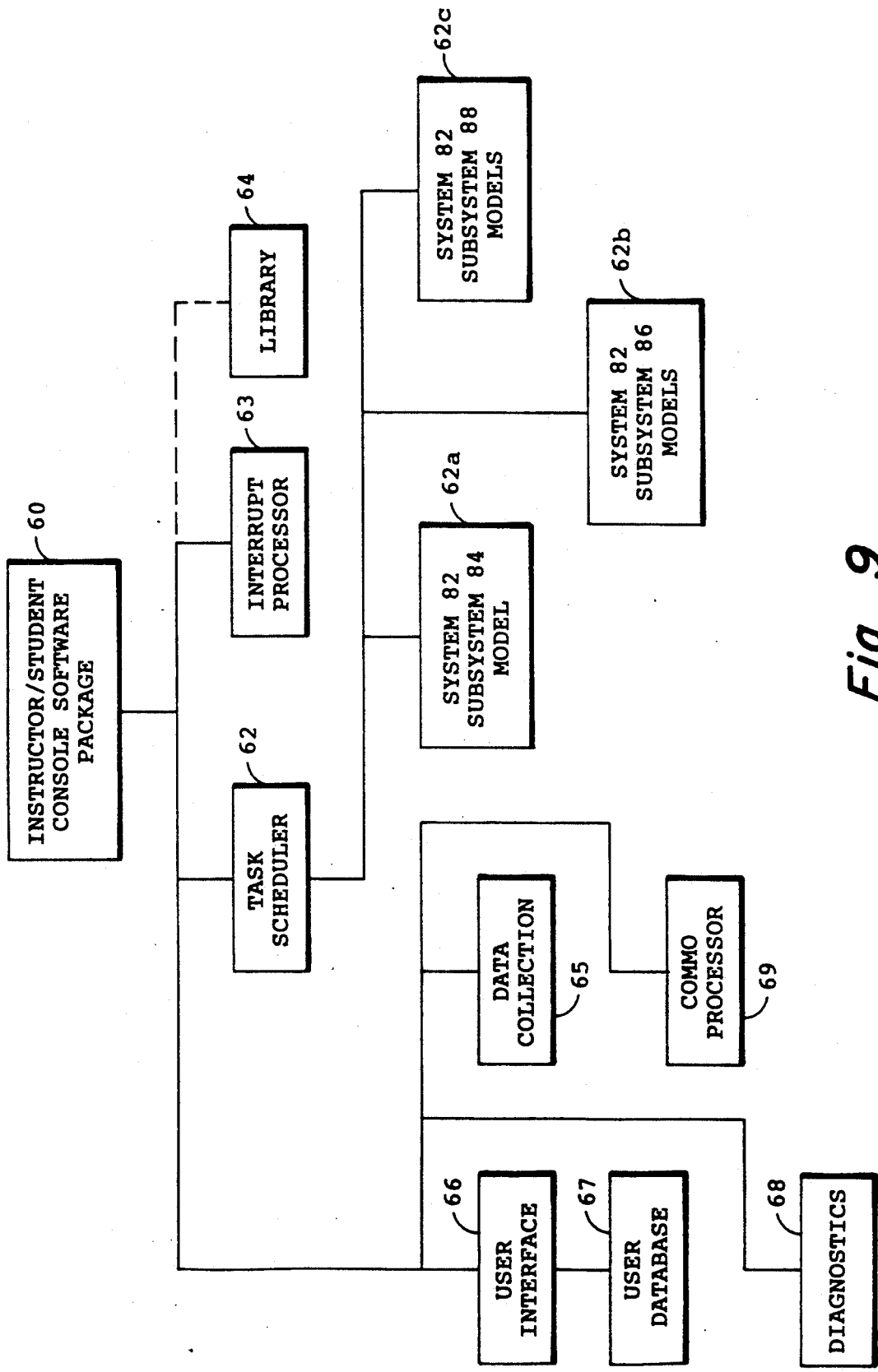
FIG. 9 is a block diagram representative of principal software modules contained in the instructor/student console.

Referring now to FIG. 9, a software tree diagram 60 representative of a typical software package installed on the instructor/student console 20 is shown to include various software modules. The task scheduler software module 62 permits the system 10 to have multi-tasking capabilities. Multi-tasking allows the instructor/student software to run multiple SIMCONs, here 40a–40b. In the simulator, to simulate a HAWK surface-to-air missile system, the instructor/student console 20, controls the Automatic Data Processor SIMCON, and the Tactical Display and Engagement Control Console SIMCON. The task scheduler software under which modules 62a–62c operate includes an array of pointers or a queue and an array of software timers. Here the task queue is not prioritized. Any task once started will run to completion: As tasks complete they remove themselves from the the queue.

Pseudo code for the task scheduler written in Microsoft, Inc. "C" is:
While (ISC running)
for (i=0, i<50, i+t)
if (function pointer i!=mull)
if time up i
do function i During instructor/student console initialization, the function pointer array is initialized to null pointers. Tasks which must run each time the loop is accessed can be placed in the queue or simply called prior to or after the last queue loop executes.

The interrupt processor software module 63 handles all serial port interrupts for the instructor/student console 20. The interrupt handler 63 here manages up to 6 serial ports, which are used to transfer data to and from the simulation control modules 40a–40b and the instructor/student console 20. Interrupts are used by the input-/output devices of the SIMCON 40a–40b when the SIMCON need to be serviced by the computer 11 in the instructor/student console 20.

Because of the interrupt structure in the IBM-AT, the six port interrupts are divided up as 2 groups of 3 serial ports, 1, 3, and 5, which share IRQ 4, and 2, 4, and 6, which share IRQ 3.

Each port has a 2048 byte buffer for transmitted interrupts, as well as a 2048 byte buffer for received interrupts. Handshaking is handled on the receive side by lowering RS-232 signal CTS when the buffer is ¾ full, and raising it when the buffer has been emptied.

On the transmit side, if CTS is detected low, the RS-232, interrupt on serial module 710 is changed from XMIT EMPTY to MODEM STATUS, so that the raising of CTS is immediately detected.

Initialization includes setting up the serial I/Fs and allocating buffer space. Each serial I/F is set to 38,400 baud, with the receive interrupt (recv int) enabled. The line parameters are 1 stop bit, 8 data bits, and no parity. The XMIT int is enabled only when there is data to be sent.

The XMIT and rev buffers are maintained as circular queues. Pointers are maintained to both the head and the tail. Buffer empty can be determined if the head pointer equals the tail pointer. A separate counter is maintained for number of characters in the buffer, so buffer almost full (used to determine if CTS should be lowered) and buffer almost empty (used to determine if CTS can be raised) can be tested.

An interrupt service routine written in Microsoft, Inc. "C" includes:

```
for (i = 0; i < 3; i + t) {
    while UART i int {
        if RCV int {
            input char i
            store char at head pointer;
            bump rev char count
            if rev char count > ¾ buffer size
                lower RTS;
            bump head pointer;
            if head pointer > buffer end
                set head pointer to buffer top:
        {
        if XMIT empty int {
            output char
            bump tail pointer
            if tail pointer > buffer end
                set tail pointer to buffer top;
            decrement buffer count;
            if buffer count = 0
                shut off XMIT empty int;
            else if CTS low {
                disable XMIT empty int
                enable modem status int;
            }
        }
        if modem status int {
            input modem status reg's
            if delta CTS {
                shut off modem status int;
                enable XMIT empty int;
            }
        }
    }
}
```

All ints will be serviced at a particular serial I/F before moving to the next. All serial I/Fs will be checked for pending ints upon receipt of the respective IRQ (interrupt request).

At termination of the instructor/student console program the serial I/F int's are disabled, and the original IRQ3 and IRQ4 vectors are replaced.

The library software module 64 may include several commercially available packages. The software includes packages for graphics generation, databases, and other housekeeping types of tasks.

The user interface software module 66, interfaces a user, such as an instructor or student of the system 10 to the instructor/student console 20. The interface includes a tiled windowing system. Selections are made by using either keyboard arrowing keys (contained in keyboard 18) or a mouse connected to one of the serial interfaces (FIG. of FIG. 1) to move a highlight bar or cursor to the desired location on a screen and by pressing the first letter of a selection.

A password scheme permits controlled access to the system and determines the user's access level. There may be several levels of access. For example, here the system 10 has three levels of access, key instructor access, instructor access, and student access. Key instructor access is the highest level of access and permits access to any part of the system including password generation system diagnostics, scenario creation, and saving of scenarios. The second instructor level is provided to permit access to all segments of the system, except for the portion which saves scenarios. The third level of access, student access, is the lowest access level and allows the user to run selected scenarios, which would be selected by an instructor and which would be controlled by the users access level identification.

Upon system start up the user would be required to log in his or her social security number and password. Both must be resident in a user database 67 (to be described) before access to the system is permitted. Context sensitive help is available in this module to aid the user at all levels, except for that which would compromise student learning. Thus both the instructor level and the student level receive all help available. Any attempted access to a restricted area is prompted with an "access not allowed" message to appear on the monitor screen.

After entering his SSN and password, the user sees the main menu. The main menu selections are:

Scenario Operations—actions related to scenario ops. like running, loading, saving, or creating a scenario.

Simulator Diagnostics—Functions to test the SIMCON and 3D elements of the simulator.

User Log Maintenance—entering, editing, and deleting users.

Scenario Log Maintenance—show available scenarios, delete or rename scenarios.

Exit—Return to operating system.

The user database module 67 is a submodule of the user interface module 62a and functions as a repository for user records. Each record contains the users first name, last name, social security number, password, and access level.

The software diagnostics module 68 is used to verify operation of simulator hardware. Checks are provided for the instructor/student console simulator control serial link, the serial ports in the SIMCON 40a–40c as well as the lamp module 110, switch module 210, D/A module 310, A/D module 410, graphics module 510, audio module 610 and serial line module 710.

In cases where an indication must be checked, the instructor/student console software prompts the operator to verify the indication (i.e. a particular lamp is on or off).

For each set of tests, the instructor/student console SIMCON serial link is always tested first. This is done as all commands and reports are sent via this link. The other tests include:

Serial ports: The port is initialized, and data is continuously sent out to the port. The serial device connected must be checked for operation. In the case of input channels, incoming data is displayed on the instructor/student console.

A/D channels: During this test, any analog device may be adjusted, and the instructor/student console will display the channel and the value.

Digital channels: Any optical coupler may be moved. The instructor/student console will report the channel number, as well as the difference in phase.

D/A channels: The user selects a channel and a value to send. The channel must then be checked for the correct reading based on value.

Switch module: Any switch pressed during this test should be displayed at the instruct/student console.

Lamp module: Any or all lamps may be commanded on or off. The user must insure the selected lamp(s) are in the proper state.

Audio module: The user selects a channel, frequency, volume, and waveform. The tone is sounded until commanded off by the user.

Graphics: The graphics card is tested by displaying selected video screens on the video display.

The data collection software module 65 keeps track of actions at the mock-up of the simulated system, which may also be displayed on the instructor/student console monitor 17 (FIG. 1) or sent to a printer 16 (FIG. 1). The actions "logged-in" include manipulations of switches and other control devices, opening and closing of panels, starting and ending of tasks, and so forth. Each logged action may be recorded with a time/date and scenario name to provide a complete file of an executed scenario. The data collection module does not score students, although that capability could be provided in the system. It does flag actions that would be considered harmful to either the actual system or personnel, as well as actions that are considered questionable within a given scenario, such as an attempt to run a nonexistent test. A message indicating an improper action is displayed on the instructor/student console monitor 17 (FIG. 1).

The communications processor software 69 handles communications between the instructor/student console 20 (FIG. 1) and the simulation control modules 40a–40b (FIG. 1), and thus provides the software which controls the serial channels in the instructor/student console 20 and the simulation control modules 40.

The commo processing system handles communication between the instructor/student console and SIMCON. Messages are passed between the two systems in defined formats. In the case of instructor/student console to SIMCON messages, the commo processor formats the message and sends it on to the SIMCON via the interrupt handler. For SIMCON to instructor/student console messages, the instructor/student console commo processor decodes the message from the SIMCON and routes it to the proper handler.

The message formats for ISC - SIMCON are:

|  | Byte 1 | Byte 2 |
|---|---|---|
| Lamp 1 | 000 register (5 bits) | lamp data |
| Lamp 2 | 001 register (5 bits) | lamp data |
| SIMCON Util | 010 function (5 bits) | data |
| Not assigned | 011 | |
| D/A card 1 | 100 channel # (5 bits) | data |
| D/A card 2 | 101 channel # (5 bits) | data |
| COM | 110 #1 channel # (3 bits) | data |
| Graphic | 111 Format depends on message | |

The lamp 1 and 2 messages are used to turn lamps on and off at the system mock-up (as well as relays and other items that require switching). These are provisions for two lamp modules in the SIMCON. The register number is actually the column number at the SIMCON, while the 8 bits in the lamp data value correspond to rows 0-7. Using this method allows control of 8 lamps with 1 message, reducing traffic on the serial link.

The SIMCON util message is used for general purpose messages, like commanding the SIMCON to execute diagnostics.

The format for the SIMCON util message is 5 bits for function number (32 functions total, with the second byte used for any supplementary data needed by the defined function. This message may also be used to set A/D resolutions.

The D/A messages are used to send analog information to the system mock-up 82 via D/A module 310 in the SIMCON. Channel can be a value of 0-31, while the data can be 0 (minimum reading) to 255 (max reading). This data is latched in D/A module 310 of the SIMCON.

The Com channel is used for controlling the serial ports on the SIMCON. The SIMCON will always initialize port 0, as it is the port used to communicate with the instructor/student console. This message allows initialization of the other 5 ports, as well as sending characters out any of the ports. The channel number can be any port 1-5. If the I bit is set to 1, it flags this as a command to initialize the port at the SIMCON. In this case the data contains the information for baud, parity, stop and data bits. The H bit, if set during an initial call, tells the SIMCON to ignore hardware handshaking for this port. If the I bit is low, this message sends the value in data out the port number defined in channel number.

The graphic message is used to call graphics routine in the SIMCON. The different types of routines includes point objects, lines, screens, doppler, text, and targets.

Also shown in FIG. 9 are three software models 62a-62c, which run under the control of the task scheduler 62, and which are the basis for emulating the operation of the system during a maintenance training task mode. Here each model is based on maintanance of different subsystems, the the so-called HAWK Phase III surface-to-air missile system. These software model modules, as shown in FIG. 9 will not be further described, herein since they are unique to the particular system being simulated, and in general are the only significant portions of the simulator 10, which are not generic.

Nevertheless, a general approach to provide a software model to emulate a system is that a boolean expression of the system to be simulated is first generated. Thus, for a maintenance simulation, the model should be that of the system operating properly without any faults. Then after such a system is correctly modeled, addition submodules (not shown) are written which create faults in the model of the system without faults. These model faults result in messages which are sent to the SIMCONs 40a-40b and result in changes at the system mock-up 82. The maintenance trainee then responds to such changes, and his actions are monitored and recorded in the instructor/student console.

Figure 10:
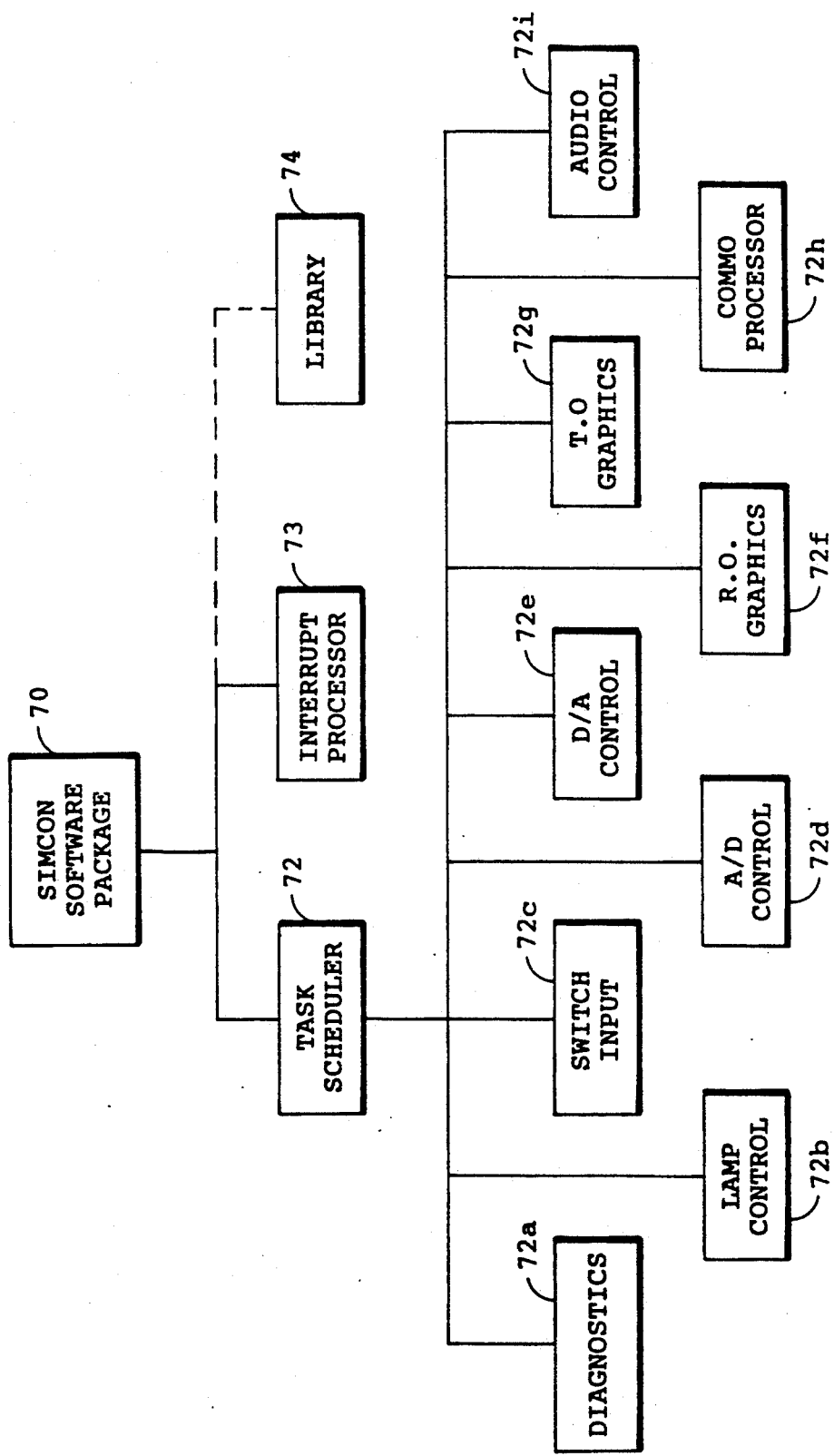
FIG. 10 is a block diagram representative of principal software modules contained in the simulation control assembly.

Referring now to FIG. 10, the firmware/package 70 used to operate a SIMCON, here SIMCON 40a (FIG. 2) resident in EPROM 45 (FIG. 2), is shown to include a task scheduler 72, which is similar to the task scheduler 62 (FIG. 9) in the instructor/student software 60 (FIG. 5). The significant difference between this task scheduler 72 and the aforementioned task scheduler is that the SIMCON task scheduler 72 runs continuously, whereas the instructor/student task scheduler 62 runs only when a scenario (i.e. module 62a-62c) is in progress. An interrupt processor 73, as in the instructor/student console software 60, uses interrupts to signal the CPU 44 (FIG. 2) that some change in status has occurred. The SIMCON interrupt processor 73 handles these interrupts in a similar manner as the instructor/student version. Because of the assorted duties of a SIMCON, such as controlling lamps, switches, A/D channels, D/A channels, etc., there are additional interrupts which must be serviced by the SIMCON interrupt processor software 73. The library software 74 is the same library as resident on the instructor/student console.

A diagnostics module 72a, which runs under the control of task scheduler 72 is used to perform confidence tests on the SIMCON installed module cards. Test results are sent to the instructor/student console. The SIMCON diagnostics are also linked to the instructor/student console. The instructor/student console diagnostics use some of the SIMCON diagnostics routines to perform instructor/student generated diagnostic requests. The principle checks performed by the SIMCON diagnostics are to determine the card complement in the SIMCON module and perform memory and input/output checks on the installed cards.

A lamp control software module 72b, also under control of the task scheduler as are the remaining modules to be described, receives commands from the instructor/student console 20 (FIG. 1) to illuminate or extinguish a desired lamp on the system mock-up 80. Each message is decoded to determined the appropriate lamp or lamps to control. A single message can contain the information necessary to change the status of up to 8 lamps. The decoded information is passed through the lamp card where it is sent out to the individual lamps, as generally described in conjunction with FIG. 3. The code written in Microsoft, Inc. "C" is found as part of the SIMCON. C software in Appendix A.

The switch input software 72c receives interrupts generated by the CPU 240 (FIG. 4) based on firmware resident on the switch control card 210 (FIG. 3) in the SIMCON. Once an interrupt is received, the switch interrupt software accesses a formatted message from the switch card 210 (FIG. 4) identifying row, column, and switch data and sends this information to the instructor/student console computer 11 (FIG. 1) via the serial card 710. The software for the input switch modules is in Appendix B. The firmware, which is resident on the switch module, is in Appendix C.

The A/D control software in the SIMCON receives interrupts from the A/D module based firmware in the SIMCON. When an interrupt is received, formatted messages from the A/D card are sent to the communications processor for ultimate passage to the instructor/student console. The software for A/D control is found in Appendix D. The code for A/D firmware is found in Appendix E.

The D/A control software 72e receives messages from the instructor/student console (part of SIMCON, C in Appendix A) to control analog devices, such as meters on the system mock-up 80. Once received, the SIMCON decodes the messages to determine the channel and value to send to the selected meter on the mock-up system 82.

The IND1 graphics software 72f contains graphic screens and character generation routines for display at a first graphics indicator on the system mock-up 82e. This software module is generally unique to the particular system being simulated. Here, the IND1 graphics software is used to control a first display on the simulated system. IND2 graphics is used to generate screens and characters for a second display on the system 82. Generally only one of said packages are executed by a SIMCON. Both packages are installed on each SIMCON to maintain commonality.

The SIMCON como processor 72g passes messages between a SIMCON 40a and the instructor/student console 20. The como software decodes messages coming from the instructor/student console and decodes outgoing messages to the instructor/student console. The software for the commo processor is contained in Appendix F.

The message formats for SIMCON to instructor/student console are:

|  |  | Byte 1 | Byte 2 |
|---|---|---|---|
| A/D 1 lower | 000 | channel # (5 bits) | DATA |
| A/D 1 upper | 001 | channel # (5 bits) | DATA |
| Switch 1 | 010 | P 3 bits unused | Switch num a bits |
| Switch 2 | 011 | P 3 bits unused | Switch num a bits |
| A/D 2 lower | 100 | channel # (5 bits) | DATA |
| A/D 2 upper | 101 | channel # (5 bits) | DATA |
| Com | 110 | channel # (3 bits) | DATA |

The A/D messages report both A/D and optical coupler data. In the case of A/D data, the value is 0-255, and reflects the current conversion value of that particular channel. For optical coupler reporting, the value represents the amount of change from the last report, and may be +127, −128.

The switch num in the switch message is the switch (column+row). The P is set to 1 if the switch is pressed, and 0 if it was released.

The Com function simply sends data received on any of the serial channels up to the instructor/student console. Channel 0 is not reported, as that is the SIMCON instructor/student console commo channel.

The audio control module software 72i (part of SIMCON, C) controls sound generation at the instructor/student console. The audio is used to simulate an audio test or indication as would occur in an actual system. It permits the selection of the volume, frequency, as well as waveform of the desired audio information. It may also be used in operator training for example, to simulate audio dopler frequency shift.

Having described preferred embodiments of the invention, it will now become apparent to one of skill in the art that other embodiments incorporating their concepts may be used. It is felt, therefore, that these embodiments should not be limited to disclosed embodiments, but rather should be limited only the the spirit and scope of the appended claims.

What is claimed is:

1. Apparatus comprising;
   first means for detecting and converting signals representative of rotational motion into a first plurality of digital signals representative of said motion;
   second means, fed by a second plurality of digital signals representative of a selected state of one of a plurality of indicator devices, for sending a signal to control said selected one of the plurality of indicator devices and for selecting the one of the plurality of indicator devices to receive such signal;
   third means, fed by a third plurality of signals representative of a corresponding plurality of switchable signal paths, for sequentially providing an electrical signal to each of said plurality of switchable signal paths in order to detect the state of opening and closing of said signal path and, for determining the state of a detected signal path and the location of the detected signal path and for providing a digital signal representative of the state of said detected signal path and the location of said detected signal path; and
   controller means, adapted to be coupled to a processor means for feeding said controller means a fourth plurality of signals representative of a sequence of instructions corresponding to a model of a system being simulated by said apparatus, for providing said second plurality of digital signals representative of said selected state of one of said plurality of indicator devices, and for executing said instructions to control said first, second, and third means in accordance with the model of the system being simulated by said apparatus, said controller means being fed by said first plurality of digital signals representative of said rotational motion and said digital signal representative of the state of said signal path and the location of said signal path.

2. Apparatus as recited in claim 1 further comprising:
   fourth means, fed by a fifth plurality of digital signals provided by said controller means, said fifth plurality of digital signals being representative of one state of a plurality of analog meter displays, for converting said digital representation of said analog meter display into an analog representation of said meter display and for selecting one of said plurality of analog meter displays.

3. Apparatus as recited in claim 2 further comprising:
   fifth means, fed by a sixth plurality of digital signals provided by said controller means, said sixth plurality of digital signals being representative of audio information, for converting said sixth plurality of digital signals into an audible representation of said audio information.

4. Apparatus for simulating a system, comprises:
   a simulation controller, comprising:
      first means for detecting and converting signals representative of rotational motion into a first plurality of digital signals corresponding to an occurrence and value of said rotational motion;
      second means, fed by a second plurality of a digital signals representative of selected one of a plurality of indicator devices, for sending a signal to control said indicator device and for selecting the one of the plurality of indicator devices to receive said signal;

third means, fed by a third plurality of signals representative of a corresponding plurality of signal paths, for sequentially providing an electrical signal to each of said plurality of signal paths in order to detect the state of opening and closing of said signal path and for determining the state of said signal path and the location of the detected signal path and for providing a fourth plurality of digital signals representative of the state of such signal path and the location of such signal path;

controller means, adapted to be fed by a fifth plurality of signals representative of a sequence of instructions corresponding to a model of a system being simulated by said apparatus and fed by said first plurality of digital signals representative of said rotational motion and said fourth plurality of digital signals representative of the state of said signal path and the location of said signal path, for providing said second plurality of digital signals representative of said selected state of one of said plurality of indicator devices, for executing said sequence of instructions to control said first, second, and third means in accordance with the model of the system being simulated by said apparatus and for providing a sixth plurality of digital signals representative of said first, second, and fourth plurality of digital signals;

means, coupled to said simulation controller, for providing a mock-up of an actual system being simulated including a control panel corresponding substantially to the actual system and having disposed thereon, switches, indicator lights, and rotational motion controls corresponding to those of the actual system and for providing said third plurality of signals representative of said corresponding plurality of signal paths; and processor means, coupled to said controller means, for providing said fifth plurality of digital signals representative of said sequence of instructions corresponding to said model of said system being simulated by said apparatus and for receiving said sixth plurality of digital signals and for processing such received signals in accordance with said sequence of instructions corresponding to the model of the system simulated by the apparatus.

5. Apparatus as recited in claim 4 wherein said control panel of said means for providing a mock-up has analog meter displays and audio transducers disposed thereon and wherein said simulation controller further comprises:

fourth means, fed by a seventh plurality of digital signals provided by said controller means, said seventh plurality of digital signals being representative of one state of a plurality of analog meter displays, for converting said digital representation of said analog meter display into an analog representation of said meter display and for selecting the one of said plurality of analog meter displays which receives the analog signal; and means, fed by digital signals representative of audio information provided by said controller means, for converting said digital signals into an audible representation of said information.

6. Apparatus as recited in claim 4 wherein said first means for detecting and converting the signals representative of rotational motion comprises:

first A/D conversion means, for converting an analog signal representative of rotational motion to a digital representation of said analog signal;

means fed by said analog signal and coupled to said first A/D conversion means for sequentially feeding a select one of a plurality of analog signals to said first A/D conversion means; and means for monitoring said first A/D conversion means and for determining when said first A/D conversion means has converted a value of said selected one of said analog signals which has been changed a predetermined amount relative to a previous value of said selected one of said analog signals for providing a signal to said controller means to cause said controller means to be fed said digital signals representative of said rotational motion.

7. Apparatus as recited in claim 6 wherein said means for monitoring said first A/D conversion means further comprises:

means, fed by a pair of pulse train signals in response to a continuously rotatable rotational motion device, for providing a digital representation of an indication of the direction of motion of said continuously rotatable rotational motion device.

8. Apparatus as recited in claim 7 wherein said pair of pulse train signals have a differential phase shift between corresponding pulses, and said means for providing an indication of a direction of rotation including means for comparing the differential phase shift between said pair of pulses for determining the direction of rotation of said continuously rotatable rotational motion device.

9. Apparatus as recited in claim 6 wherein said means for sequentially feeding a selected one of said analog signals to said first A/D conversion means comprises:

a plurality of analog multiplexers, each fed by one of said plurality of rotational motion devices.

10. Apparatus as recited in claim 4 wherein said plurality of signal paths of said third means for sequentially providing an electrical signal to each of said plurality of signal paths in order to detect the state of opening and closing of said signal path further comprises:

first and second pluralities of signal paths, with each one of said plurality of paths having a first end thereof coupled to one of the first plurality of signal paths, and a second end thereof coupled to one of the second plurality of signal paths, with each one of said paths being detected by feeding said electrical signal sequentially to each one of said first plurality of signal paths and receiving said signal on those of said second plurality of signal paths for determining which of said plurality of signal paths are closed.

11. Apparatus for simulating a system comprising:

a simulation controller comprising:

first means for detecting and converting signals representative of rotational motion comprising:

first A/D conversion means for converting an analog signal representative of rotational motion to a digital representation of said analog signal;

means for multiplexing a plurality of analog signals provided from a corresponding plurality of rotational motion devices to provide a selected one of said analog signals to said A/D conversion means;

means, fed by a pair of pulse train signals in response to a continuously rotatable rotational motion device, for providing a digital representation of the direction of at least one of a continuously rotatable rotational motion device; and means for monitoring said first A/D conversion means and said providing means and for determining when a converted value corresponding to a selected one of said rotational motion devices or said continuously rotatable rotational motion devices has been changed by a predetermined amount relative to a previous value of said first A/D conversion means or said providing means and for generating a first plurality of digital signals representative of the value of said selected rotational motion or said continuously rotatable rotational motion device;

second means for detecting a state of opening and closing of a plurality of switchable signal paths comprising:

means for sequentially providing an electrical signal to each of said switchable signal paths and for detecting which of said switchable signal paths are open and which of said switchable signal paths are closed with said switchable signal paths including first and second pluralities of signal paths with each one of said plurality of switchable paths having a first end thereof coupled to one of the first plurality of signal paths, and a second end thereof coupled to one of the second plurality of signal paths, with each one of said switchable paths being detected by feeding said electrical signal sequentially to each one of said first plurality of signal paths and receiving said signal on closed ones of each of said second plurality of signal paths to provide a second plurality of digital signals corresponding to the state and location of said signal paths;

third means, fed by a third plurality of digital signals representative of a selected state of one of a plurality of indicator lights, for sending a signal to control said selected one of the plurality of indicator lights and for selecting the one of the plurality of indicator lights to receive such signal;

controller means, for providing said third plurality of digital signals representative of a selected state of one of said plurality of indicator lights, for executing a sequence of instructions to control said first, second, and third means in accordance with a model of the system being simulated by said apparatus and for providing a fourth plurality of digital signals representative of said first, second, and third plurality of digital signals, said controller means fed by a fifth plurality of signals representative of said sequence of instructions corresponding to said model of a system being simulated by said apparatus and fed by said first and second plurality of digital signals;

processor means, coupled to said controller means, for providing said fifth plurality of digital signals representative of said sequence of instructions corresponding to said model of said system being simulated by said apparatus, and for receiving said fourth plurality of digital signals and for processing said fourth plurality of digital signals in accordance with the sequence of instructions corresponding to said model of said system simulated by the apparatus; and means, coupled to said simulation controller, for providing a mock-up of the system being simulated including a control panel corresponding substantially to the system being simulated and having disposed thereon, switches, indicator lights, and rotational motion controls.

12. Apparatus as recited in claim 11 wherein said mock up has a plurality of analog meter displays; and said apparatus further comprises:

first D/A conversion means, fed by digital signals from said controller means corresponding to a desired value of an analog signal, for converting said digital signals to an analog representation of said digital signals, and for feeding said plurality of analog meter displays with the analog representation of said digital signals being provided in accordance with the model of the system being simulated.

13. Apparatus as recited in claim 11 further comprising:

audio conversion means, coupled to an audio transducer for converting a digital signal from said controller means to an analog representation of said digital signal.

14. Apparatus as recited in claim 13, wherein said audio conversion means comprises:

a plurality of channels, each channel including: a pair of digital of analog converters with a first one of said pair of digital to analog converters in each channel fed a first digital signal related to an amplitude level to convert said first digital signal to a first analog signal representative of said first digital signal, and the second one of said digital to analog converters in each channel fed a second digital signal related to a frequency to convert said second digital signal to an analog representation of said second digital signal;

waveform generating means, fed by said second digital signal for providing a plurality of signals having waveforms at the selected frequency; and means, fed by said plurality of signals having waveforms at the selected frequency and said analog representation of said first digital signal related to an amplitude level, for selecting one signal of said plurality of signals having waveforms at the selected frequency and for providing said selected signal with an amplitude related to the first analog signal.

15. Apparatus as recited in claim 14 wherein said means for selecting one of said plurality of signals having waveforms further comprises:

a plurality of multiplexers fed by said plurality of signals having waveforms, and a plurality of digital select signals to select one of said plurality of signals having waveforms to an output of each multiplexer in accordance with said digital select signals; and means, fed by selected signals having waveforms from each one of said plurality of multiplexers and fed by analog signals from said first one of said pair of digital to analog converters in each channel, for providing said output signal having an amplitude in accordance with said analog signals and for providing for a composite output signal which is composed of said selected signals from each channel.

16. Apparatus as recited in claim 15 wherein said waveform generating means provides triangular, square, and sine waveforms.

* * * * *